United States Patent
Reding et al.

(10) Patent No.: US 6,480,598 B1
(45) Date of Patent: Nov. 12, 2002

(54) METHODS AND APPARATUS FOR AUTOMATING THE TELEPHONE OPERATOR SERVICES

(75) Inventors: Craig Reding, Midland Park, NJ (US); Menno Aartsen, Arlington, VA (US); Lisa M. Amberger, Ossining, NY (US); Constance Carlson, Clinton Corners, NY (US); Suzi Levas, Nanuet, NY (US); Mike Metaxas, Bayside, NY (US); Jan Stein, Danbury, CT (US); Rao Tanuku, Nanuet, NY (US); Thea Turner, Evanston, IL (US)

(73) Assignee: Verizon Services Corp., Arlington, VA (US)

( * ) Notice: Subject to any disclaimer, the term of this patent is extended or adjusted under 35 U.S.C. 154(b) by 0 days.

(21) Appl. No.: 09/156,188

(22) Filed: Sep. 17, 1998

Related U.S. Application Data

(63) Continuation-in-part of application No. 09/154,014, filed on Sep. 16, 1998, now Pat. No. 6,108,410
(60) Provisional application No. 60/059,081, filed on Sep. 16, 1997.

(51) Int. Cl.⁷ ............................................... H04M 5/00
(52) U.S. Cl. ........................... 379/265.01; 379/265.04; 379/266.07
(58) Field of Search ............................... 379/265, 266, 379/267, 268, 269, 273, 67.1, 265.01, 265.02, 265.04, 265.11, 266.01, 88.01, 266.07, 264, 308, 309; 704/270

(56) References Cited

U.S. PATENT DOCUMENTS

| | | | |
|---|---|---|---|
| 4,620,066 A | 10/1986 | Bushnell et al. ............. 379/223 |
| 4,797,910 A | 1/1989 | Daudelin .................. 379/88.01 |
| 4,797,911 A * | 1/1989 | Szlam et al. .............. 379/88.22 |
| 4,922,519 A | 5/1990 | Daudelin .................. 379/88.01 |
| 5,163,083 A | 11/1992 | Dowden et al. ........... 379/88.03 |
| 5,181,237 A | 1/1993 | Dowden et al. ........... 379/88.03 |
| 5,210,789 A | 5/1993 | Jeffus et al. ............. 379/127.01 |
| 5,309,504 A * | 5/1994 | Morganstein ............... 379/67.1 |
| 5,361,295 A | 11/1994 | Solomon et al. ........... 379/67.1 |
| 5,559,878 A * | 9/1996 | Keys et al. .................. 379/265 |
| 5,621,729 A * | 4/1997 | Johnson et al. .......... 379/93.02 |
| 5,703,943 A * | 12/1997 | Otto .......................... 379/265 |
| 5,901,209 A * | 5/1999 | Tannenbaum et al. ...... 379/142 |
| 5,974,135 A * | 10/1999 | Breneman et al. ..... 379/265.04 |
| 5,987,115 A * | 11/1999 | Petrunka et al. ............ 379/265 |
| 6,064,874 A * | 5/2000 | Cox et al. ................ 379/88.13 |

* cited by examiner

Primary Examiner—Fan Tsang
Assistant Examiner—Ovidio Escalante
(74) Attorney, Agent, or Firm—Leonard C. Suchyta; Loren C. Swingle

(57) ABSTRACT

Methods and apparatus for providing operator services to callers in a fully or partially automated manner are disclosed. In addition, the present invention is directed to methods and apparatus for providing new telephone services, e.g., the forwarding of messages to non-published telephone number customers. It is also directed to methods and apparatus that can be used to detect, report and correct operator input errors. Automated, e.g., unmanned, apparatus of the present invention are capable of interfacing with conventional telephone switches using known operator protocols. This allows automated devices of the present invention to appear to existing telephone switches as manned operator positions capable of servicing telephone calls. In accordance with the present invention, the unmanned apparatus of the present invention is assigned one or more operator position identifiers conventionally used to identify manned operator positions. The interaction of the automated apparatus of the present invention and a telephone switch involves the use of the assigned operator position identifiers to identify the apparatus of the present invention to the switch as one or more operational operator positions. Once logged in with the telephone switch, the apparatus of the present invention can service calls normally handled by human operators, without the need for a human operator's involvement.

25 Claims, 13 Drawing Sheets

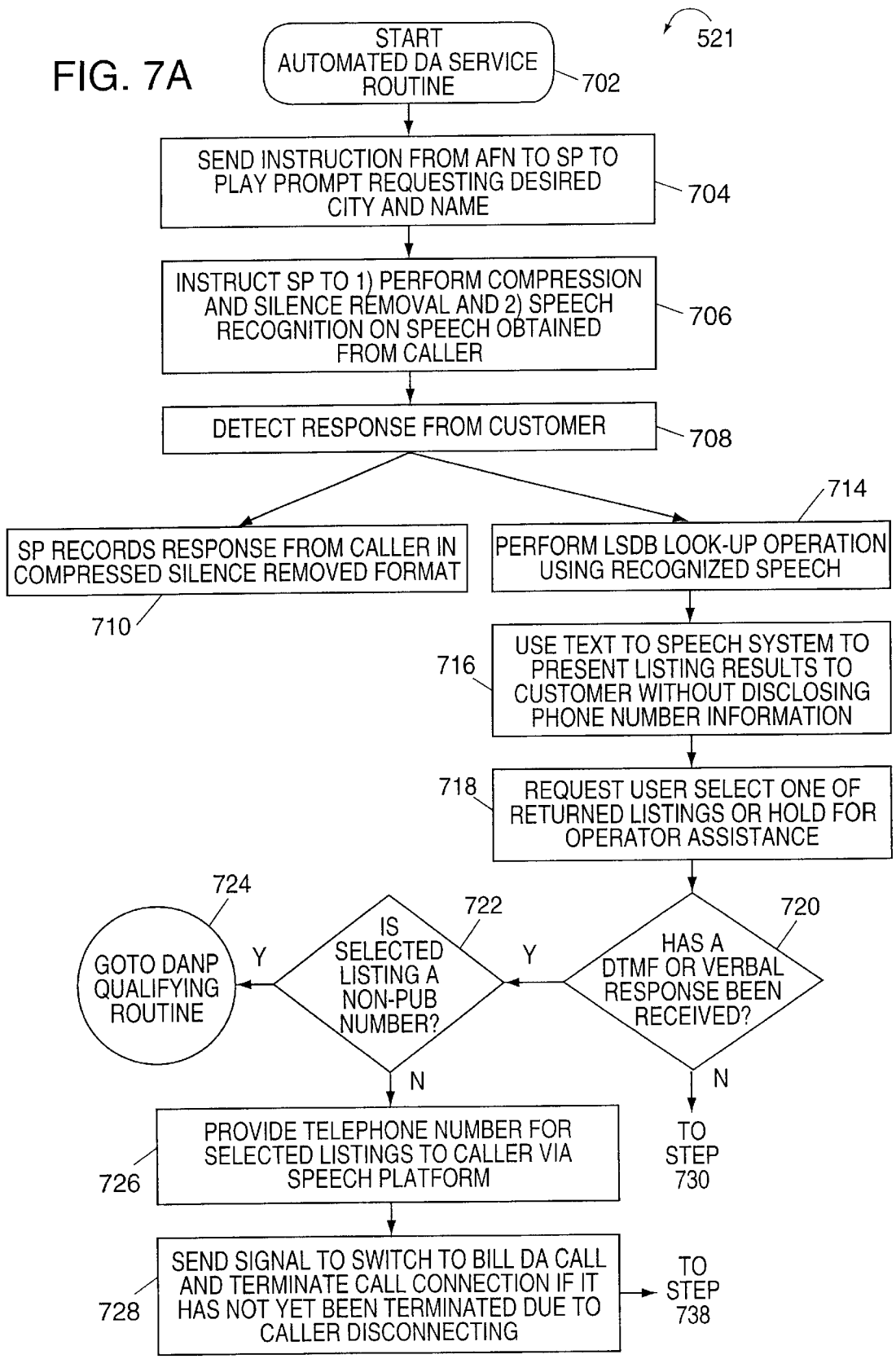

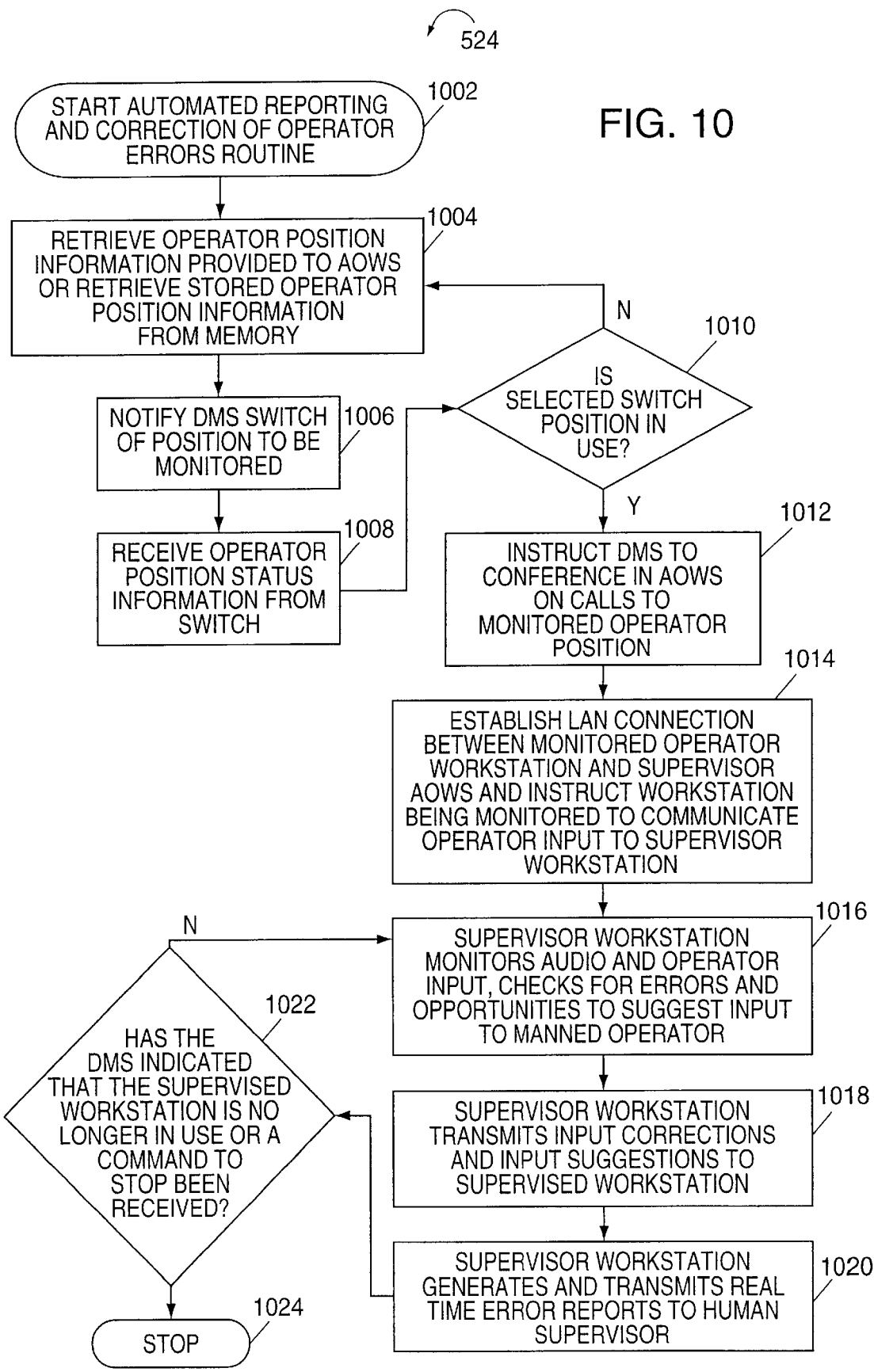

METHODS AND APPARATUS FOR AUTOMATING THE TELEPHONE OPERATOR SERVICES

RELATED APPLICATIONS

This application is a continuation-in-part of U.S. patent application Ser. No. 09/154,014, which was filed on Sep. 16, 1998 now U.S. Pat. No. 6,108,410 which claims the benefit of U.S. Provisional Application Ser. No. 60/059,081, filed Sep. 16, 1997.

FIELD OF THE INVENTION

The present invention relates to communications systems, and more particularly to methods and apparatus for facilitating operator assisted telephone calls, automating operator services, providing enhanced telecommunications services, and detecting, reporting and correcting operator input errors.

BACKGROUND OF THE INVENTION

Computer systems have become an integral part of providing communication services, e.g., telephone services. They are frequently used by telephone operators, e.g., to service operator assisted telephone calls. Operator assisted calls include, e.g., directory assistance calls, calls requesting initiating of telephone conferences, requests for billing credit, etc.

Human telephone operators frequently work at computer systems referred to as operator workstations. These workstations are normally coupled to a telephone switch via separate bi-directional data and audio channels of a T1 link. The pair of data/audio channels used to service telephone calls and convey call audio, call data and call processing instructions between a switch and an operator workstation is commonly referred to as an operator interface. Protocols which allow an operator to communicate with a switch over such an interface are commonly referred to as operator interface protocols. In order to allow an operator to support a wide range of call processing transactions operator protocols support call transfer, billing, call connection instructions, in addition to commands which allow an operator to issue credits and to do a wide range of other call processing operations from an operator workstation.

Current automated call processing devices, including most intelligent peripherals, tend to be designed for specific functions, e.g., speech recognition, which are much more clearly defined and limited in comparison to the wide range of call processing functions a human operator working at an operator workstation is expected to perform. Fully automated devices tend to use protocols and interfaces which are more limited in terms of functionality than the operator interfaces and protocols used to interface with manned operator workstations.

A conventional telephone system 100 including manned operator workstations for servicing telephone calls, e.g., directory assistance telephone calls, is illustrated in FIG. 1.

As illustrated, the known telephone system 100 comprises a plurality of telephones 102, 104 which are coupled by POTS lines to a digital multiplexed switch (DMS) 106. The DMS 106, in turn, is coupled to an operator service center (OSC) 110 via a T1 link 108. As is known in the art, a T1 link comprises 24 communication channels, each of which may be used to communicate audio or data signals. In addition to the OSC 110, the system 100 comprises a voice function node (VFN) 112 and a listing service data base (LSDB) located at a physical, usually central site, identified as the LSDB site 114. The VFN is used for, e.g., playing prompts and providing listing information to a caller. The LSDB 116 is used to perform database look-up operations and to output both published and non-published telephone number listing information, e.g., to a telephone operator and/or the VFN 112.

The LSDB is coupled to the OSC 110, the DMS 106 and the VFN 112 by data lines 107, 109, 111 respectively. The VFN in turn, is coupled to the DMS by a voice line 113.

The OSC 110 includes various components which facilitate the servicing of a call by a human operator. The OSC 110 includes a channel bank 118, a pair of first and second protocol converters 120, 122, a local area network (LAN) 126 router 124 and a plurality of operator workstations 128, 130, 132, 134, 136, 138. While 6 operator workstations are shown, OSC's normally include additional workstations. The maximum number of workstations is, in part, limited by the number of T1 links which are coupled to the OSC.

As discussed above, a T1 link supports 24 channels. The channel bank 118 operates to separate the channels of the T1 link 108. As is customary, in the FIG. 1 example two channels of the T1 link are used for data and the remaining channels are used for audio signals. One audio channel per operator workstation is normally employed. In FIG. 1, the individual line entering the top of each operator workstation 128, 130, 132, 134, 136, 138 represents the audio channel used by the operator workstation. The lines extending from the channel bank 118 to the protocol translators 120, 122 each represent one data channel. A single T1 data channel may be shared by multiple workstations. In the FIG. 1 system since 2 of the T1's channels are used for data, 22 channels remain which may be used as voice channels. Accordingly, 22 operator workstations may be supported by the T1 link 108.

The protocol converters 120, 122 convert between an X.25 communication protocol used by the switch and an Ethernet protocol used by the LAN 126. The lines extending from the LAN 126 into the bottoms of the workstations 128, 130, 132 134, 136, 138 represent data connections. Accordingly, each workstation is supported using one pair of audio/data connections.

The use of a router 124 to couple the LAN 126 to the LSDB is illustrated in FIG. 1. By using a router in this manner, operators working at the workstations can gain access to the LSDB site in order to obtain listing information required to service directory assistance calls.

Operator time is a large component of the cost of servicing a directory assisted telephone call. In order to reduce costs, the announcement of telephone listing information once determined through operator/customer interaction is now performed primarily by automated announcement systems which are sometimes called voice function nodes (VFNs). Because VFNs tend to be used after an operator has his/her interaction with the customer, the use of a VFN for telephone number announcement purposes represents an automated post-operator call processing operation. Such an operation is in contrast to a pre-operator call processing operation which would involve processing a call prior to it being presented to a human operator.

Directory assistance call processing using the known system 100 is exemplary of known operator assisted call processing techniques. For this reason, conventional servicing of a directory assistance call by a human operator using the system 100 will now be discussed.

Before a human operator can service calls, the operator must first login on the operator workstation. Operator login is normally initiated on a workstation 128, 130, 132, 134, 136, 138 in response to the workstation detecting the manual insertion of a operator headset connection into a port on the workstation. In response to the human input, the operator workstation transmits a signal to the DMS indicating that the operator position is manned and ready to service calls. The login signal to the DMS includes an operator position ID which uniquely identifies the operator workstation. Because each operator workstation 128, 130, 132, 134, 136, 138 provides a position where a single operator can work, a conventional operator workstation is sometimes referred to as an operator position. It also may include a signal indicating the types of calls which the operator is authorized to service.

Once an operator is logged in, an authorized operator can process directory assistance calls. The DMS 106 maintains queues of calls to be processed according to call type, e.g., a queue of DA calls is maintained. As a function of operator availability, the DMS 106 assigns calls from the queues to active operator positions which are authorized to service the queued calls.

Servicing of a queued DA call by the conventional system 100, begins with the DMS 106 assigning the queued call to an available operator and connecting the call to the operator position 128, 130, 132, 134, 136, or 138 to which the call is assigned. As part of connecting the call to the operator, data including, e.g., a call ID number, ANI information, call type information, etc. is transferred to the assigned operator position via the data connection with the LAN 126 while a voice connection is established via the voice channel which exits between the channel bank 118 and the operator position.

In response to receiving the DA call, the operator requests city and listing (name) information from the caller. Upon receiving an audio response to the inquiry, the operator manually keys in the listing information and initiates a listing service database (LSDB) look-up operation in an attempt to retrieve the requested listing information. The look-up request is transmitted via the LAN 126 and router 124 to the LSDB 116 which returns listing information to the operator.

The operator reviews the returned listing information and selects one returned listing as the listing to be provided to the caller. Once the listing selection has been made, the operator initiates a release of the call. In addition at sometime during the DA call, in response to operator input, the operator workstation transmits billing information to the DMS.

In response to the listing selection information and release signal, the LSDB sends data to the DMS instructing the switch to release the DA call being serviced from the operator workstation. The signal to the DMS normally includes the operator position ID and the call ID. The LSDB also sends a signal to the VFN indicating the listing information, e.g., telephone number, and message to be provided to the caller. The call ID is normally part of this message as well.

The VFN which is connected to the DMS then provides the listing information to the caller via an audio connection with the DMS 106. Upon hearing the audio message and listing information the caller normally hangs up terminating the call. The DMS 106 uses the billing information received in regard to the call to initiate a billing operation resulting in the caller being charged, if appropriate, for the DA call.

As discussed above, for cost reasons it is desirable to eliminate or minimize the amount of human operator time required to service calls such as DA calls. Accordingly, improved methods and apparatus for servicing such calls which minimize operator time and/or involvement in servicing such calls are desirable.

Conventional operator workstations include a fair amount of computer processing power, memory, and interface hardware. Such workstations represent significant capital investments for many telephone companies. Telephone companies need to have a sufficient number of operator workstations to support the peak demands during the day for operator services. During off-peak times, substantial numbers of operator workstations sit idle. Even during periods of peak demand for operator services, at least some operator workstations will normally be idle due to unexpected operator absences or because additional workstations are normally provided in the event that some workstations become unusable due to hardware failures. Thus, many conventional operator workstations go unused during significant portions of a day.

In order to maximize the return on purchased equipment, it is desirable that equipment be utilized to the fullest extent possible, i.e., that it not be sitting idle for significant portions of the day.

Accordingly, there is a need for methods and apparatus which would allow the use of all or some operator workstations to support billable call processing operations when not being manned by a human operator.

As competition between telephone service providers continues to grow, to remain competitive telephone companies must look not only to ways of minimizing the costs associated with providing existing services but to ways of creating new revenue sources. Providing of enhanced telephone services sometimes referred to as extended telephone services, e.g., call messaging or voice dialing, can result in new revenue sources. In addition, they can be used by telephone companies to distinguish themselves from competitors which can not or do not offer comparable services.

Accordingly, new enhanced telephone services which can be billed to customers are desirable as well as methods and apparatus for providing such services.

SUMMARY OF THE PRESENT INVENTION

The present invention is directed to methods and apparatus for providing operator services to callers in a fully or partially automated manner. In addition, the present invention is directed to methods and apparatus for providing new telephone services, e.g., the forwarding of messages to non-published telephone number customers. It is also directed to methods and apparatus that can be used to detect, report and correct operator input errors.

Automated, e.g., unmanned, apparatus of the present invention are capable of interfacing with conventional telephone switches using known operator protocols. This allows automated devices of the present invention to appear to existing telephone switches as manned operator positions capable of servicing telephone calls. In accordance with the present invention, the unmanned apparatus of the present invention is assigned one or more operator position identifiers conventionally used to identify manned operator positions. The interaction of the automated apparatus of the present invention and a telephone switch involves the use of the assigned operator position identifiers to identify the apparatus of the present invention to the switch as one or more operational operator positions. Once logged in with the telephone switch, the apparatus of the present invention can service calls normally handled by human operators, without the need for a human operator's involvement.

The unmanned automated apparatus of the present invention can interact with a caller, collect information from the caller in an interactive manner, and complete a call, including the performing of billing functions, without human operator input or involvement. The automated apparatus of the present invention may be implemented as part of an automated operator service center having a telephone switch interface which utilizes the same voice/data connections and protocols as a conventional manned operator service center. Within the automated operator service center, a computerized device referred to herein as an automated function node can be used in combination with a speech platform to provide operator services normally provided by one or more manned operator workstations.

Alternatively, the apparatus of the present invention can be used to automate portions of an operator assisted telephone call, before and/or after a human operator performs some action to service the telephone call. When a human operator is involved in servicing a call that is also being serviced by the automated system of the present invention, one or more call transfers may occur between the automated apparatus of the present invention and a manned operator workstation. Such transfers may involve the use of a telephone switch to transfer the call between, e.g., to and/or from, the manned operator workstation and the apparatus of the present invention, and vice versa, in the way a call is currently transferred between one manned operator workstation and a second manned operator workstation. In various embodiments of the present invention, the described telephone switch transfer operation occurs in conjunction with the new and novel transfer of data between the manned operator workstation and the automated system of the present invention via a local area network used to couple the two together. Because data can be transferred between the automated device of the present invention and a manned workstation, the apparatus of the present invention can be used to facilitate processing of calls involving human operators as well as performing fully automated call processing operations.

Various embodiments of the automated apparatus of the present invention incorporate speech recognition/generation devices. Speech compression and silence removal circuits may also be used, e.g., to process interactively collected data before presenting it to a human operator.

In one particular embodiment, directory assistance calls are first connected by a telephone switch to the automated apparatus of the present invention before being presented to a human operator. In such an embodiment the apparatus of the present invention prompts the caller for city and listing (name) information. The verbal response is compressed and silence is removed. It is then recorded. The call is then transferred by the automated apparatus of the present invention to a manned operator workstation by sending a transfer command to the telephone switch which presented the call to the automated apparatus. In addition to transferring the call, the apparatus transmits the compressed, silence removed speech to the human operator assigned to service the call, e.g., via a T1 connection. The operator listens to the compressed silence removed speech and then proceeds to do a data look-up operation and service the call in the usual manner. By performing the described pre-operator call processing operation, the amount of human operator time required to service the call is reduced.

In another embodiment, in addition to performing the data compression and silence removal operation, a speech recognition operation is performed and a listing data base look-up operation is automatically initiated based on the results of the speech recognition operation. The results of the look-up operation are then presented to the operator to which the call is transferred in addition to the compressed silence removed speech. The human operator reviews the results and can accept them if accurate. Otherwise the operator can initiate a new look-up operation. Since, in many cases, the result of the look-up operation presented to the operator will be correct, average operator time for servicing DA calls is reduced.

In one embodiment were DA assistance calls are serviced in a fully automated manner, the results of the automated look-up operation are presented to the caller using a text to speech system. The caller is requested to indicate whether or not the results are accurate or to select one of multiple returned entries. If the caller selects a returned result or acknowledges that the listing is correct, the automated system of the present invention instructs the telephone switch to bill the customer for the DA call and to terminate the call connection. In this manner a DA call can be completed in an automated manner without human operator involvement. If, after being presented with the listing information, the caller remains on the line and fails to acknowledge the accuracy of the results or select one of the returned listings, the call is transferred to a human operator who is provided with the recorded compressed silence removed speech and listing results.

Another feature of the present invention is directed to providing a message forwarding service to directory assistance customers requesting a non-published telephone number. In accordance with the present invention, directory assistance calls requesting non-published number information are transferred to an automated apparatus of the present invention if they are not already being serviced by such an apparatus. A directory assistance non-published number DANP application executed on the automated apparatus of the present invention then performs a database look-up operation to obtain information on the non-published number customer the caller is requesting information on. If the non-pub number customer subscribes to a message forwarding service, the caller is provided the opportunity to leave a message for the non-pub number subscriber which will be forward by the service. In this manner, a caller requesting non-published number information is provided an opportunity to send a message to a non-pub number customer without that customer's telephone number being disclosed. If the non-pub customer does not subscribe to a message forwarding service, the DA call is terminated with the caller being played a message indicating that the requested listing corresponds to a non-published number which can not be provided. The non-published message forwarding service of the present invention represents a new billable service which can serve as an additional revenue source to telephone companies which provide the service.

While the apparatus of the present invention can be used to process calls in an automated manner, in various embodiments automated function nodes of the present invention are implemented in a manner which allows them to be used as operator workstations when manned or as automated call processing devices when unmanned or as a combination of manned/unmanned operator positions. Because the automated function nodes of the present invention can be used as manned or unmanned devices, they can be utilized to perform billable call processing operations or reduce the amount of human operation time required to perform such operations, when not being used as manned operator workstations. Accordingly, the apparatus of the present invention can be used as an alternative to conventional manned workstations while offering the distinct advantage of being able to perform useful call processing functions even in the absence of a human operator.

In addition to being suitable for performing pre and post human operator interaction call processing operations, the automated apparatus of the present invention is well suited for supplementing the call processing performed by a human operator while the operator is servicing a telephone call. For example, both caller and operator input can be monitored by the apparatus of the present invention while a call is being serviced by a human operator. Operator input can be checked by the apparatus of the present invention for errors, e.g., typing and spelling errors. Corrections to operator input can be transmitted to the manned operator workstation via a LAN. The apparatus of the present invention may also suggest workstation input to a telephone operator in response to operator input or signals received from the caller. Providing suggested input which can be accepted or rejected by an operator offers the opportunity to reduce the number of keystrokes which must be entered by an operator to complete a call transaction.

Because the apparatus of the present invention supports real time monitoring of human operator input, real time error reports can be generated and transmitted to a human supervisor working in the same office as the monitored human operator. Real time error reporting of errors, e.g., within seconds or minutes of when they occur, allowing for prompt human operator supervision and investigation of the error source, whether human or mechanical. This facilitates rapid detection of, e.g., operator drug and alcohol problems, as well as mechanical sources of error such as defective workstation keyboards.

Numerous additional features, embodiments, and advantages of the methods and apparatus of the present invention are set forth in the detailed description which follows.

BRIEF DESCRIPTION OF THE DRAWINGS

FIG. 10 illustrates an automated reporting and correction of operator errors routine of the present invention.

DETAILED DESCRIPTION

As discussed above, the present invention is directed to methods and apparatus for facilitating operator assisted telephone calls, automating operator services, providing enhanced telecommunications services, and detecting, reporting and correcting operator input errors.

U.S. provisional patent application Ser. No. 60/059,081, entitled Automated Operator Workstation, Features, Architecture and Applications, which is hereby expressly incorporated by reference, describes various features of the present invention and includes as part of its disclosure a detailed specification describing one particular exemplary embodiment of the system and features of the present invention. While this provisional patent is incorporated herein and forms part of the present disclosure, it is to be understood that mandatory phrases, such as the term "must", "is required", etc., are used in the provisional patent application to describe what must be done to satisfy the specification requirements of the exemplary embodiment described in the provisional application and not something which is necessarily required to implement or practice the inventions described and claimed in the present application. Accordingly, mandatory language such as the term "must" found in the provisional patent application incorporated herein is not to be read into the present application as a limitation on the claimed subject matter or as specifying something that is mandatory to practice the inventions described herein. As will be apparent in view of the teachings of the present application, the methods and apparatus of the present invention may be implemented in several ways without departing from the scope of the inventions described herein.

Figure 1:
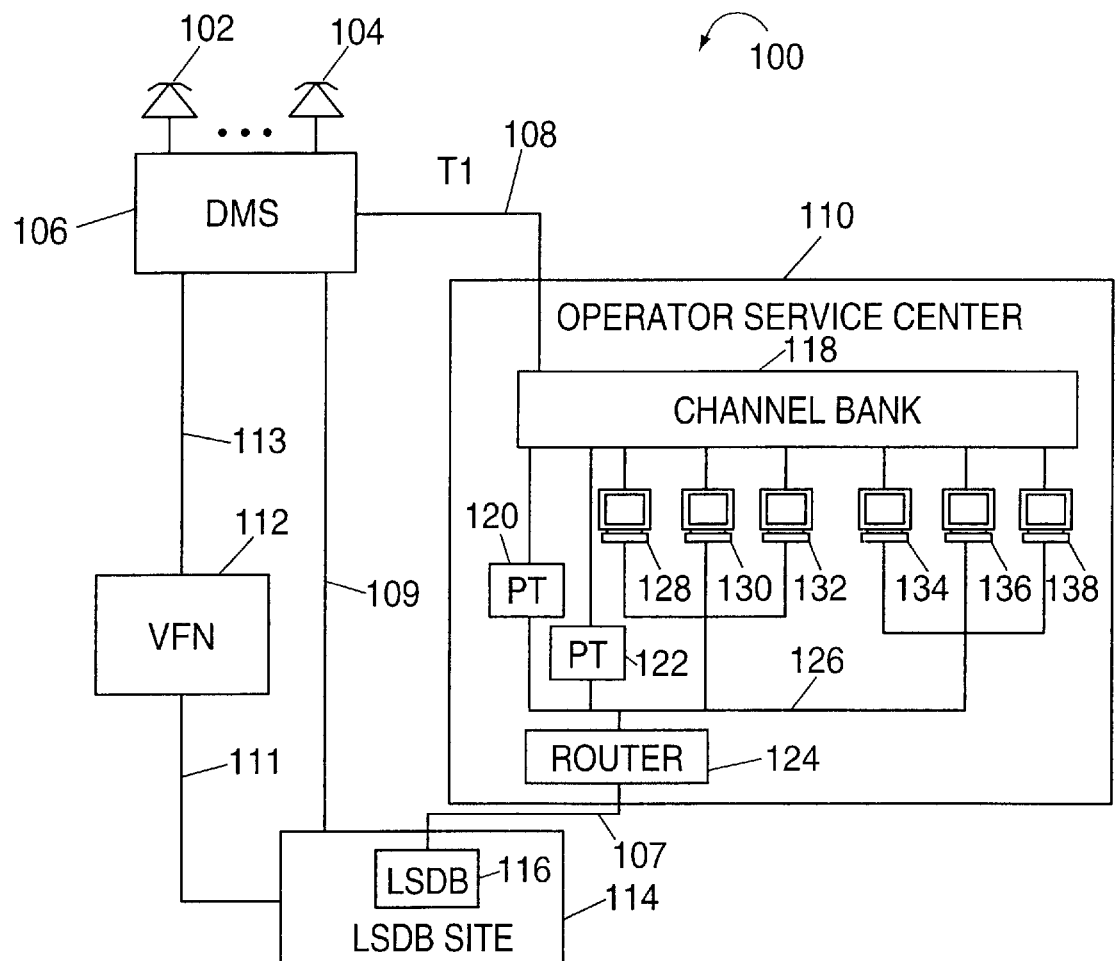
FIG. 1 is a diagram of a known telephone system including an operator service center.
Figure 2A:
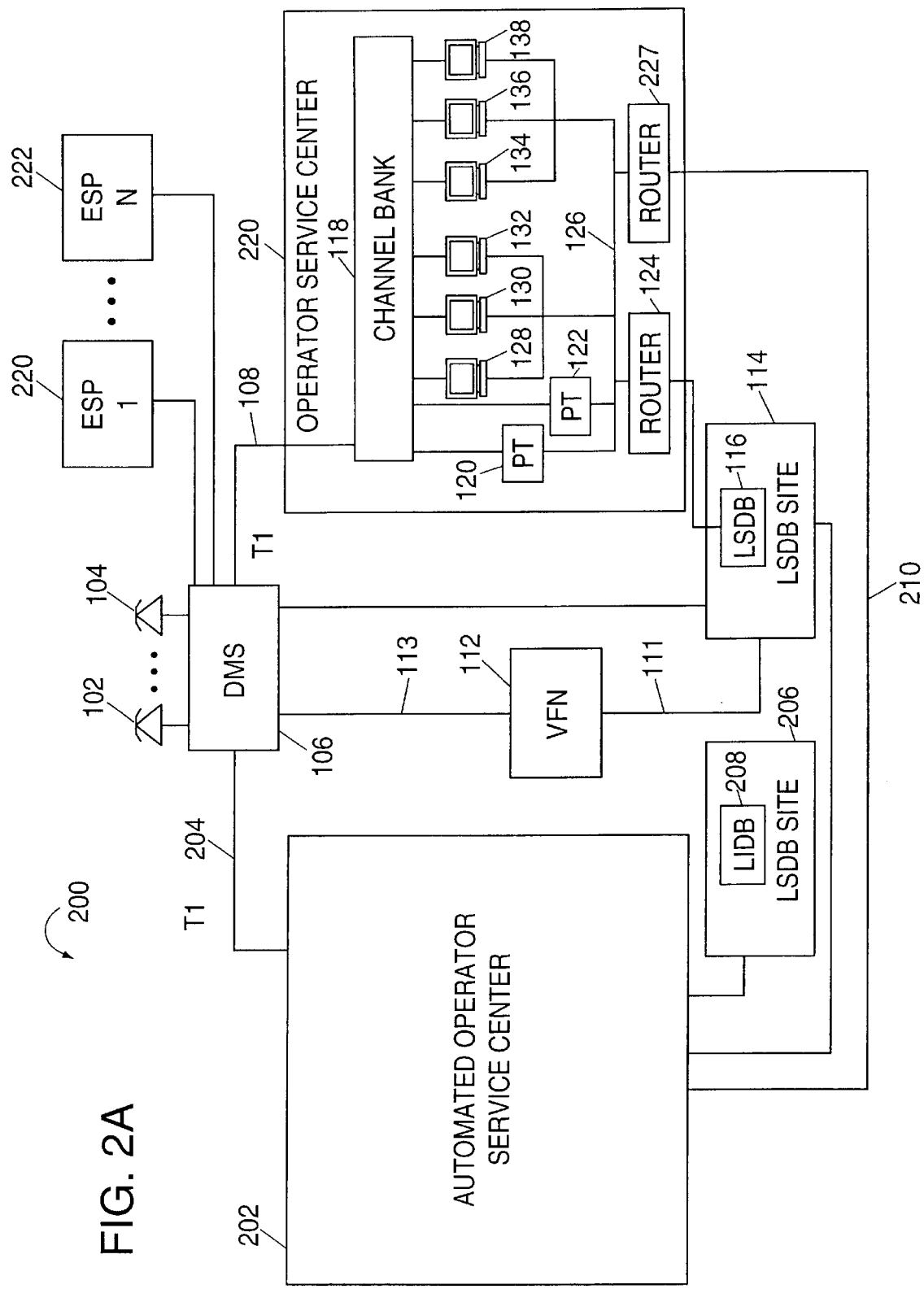
FIGS. 2A and 2B are diagrams of telephone systems, including an automated operator service center (AOSC), implemented in accordance with various embodiments of the present invention.

FIG. 2A illustrates a telephone system 200 implemented in accordance with one exemplary embodiment of the present invention. Components in the system 200 which are the same as, or similar to, the components of the known system 100 will be identified using the same reference numerals as used in FIG. 1. For purposes of brevity such components will not be described again in detail.

The telephone system 200 comprises a plurality of telephones 102, 104 coupled to a digital multiplexed switch (DMS) 106. Also coupled to the DMS 106 are a plurality of N enhanced service providers 220, 222, an OSC 220, an LSDB site 114, a VFN 112 and an automated operator service center (AOSC) 202.

The OSC 220 includes a channel bank 118, first and second protocol translators (PT) 120, 122, a plurality of conventional operator workstations 128, 130, 132, 134, 136, 138, a LAN 126 and a set of first and second routers 124, 227. Note that the OSC 220 is similar to the known OSC 110 but differs from the known OSC in that it includes a second router 227 for coupling the LAN 126 to the AOSC via line 210. As a result of the connection 210, data and information can be communicated between the workstations 128, 130, 132, 134, 136, 138 and the AOSC 202.

Note that the AOSC 202 interfaces with the DMS 106 via a T1 link 204 in a manner that is the same as or similar to the manner in which the OSC 220 interfaces with the DMS 106 via T1 link 108. Similarly, the AOSC 202 and OSC 220 are coupled to the LSDB site 114 and LSDB 116. In addition to being coupled to the LSDB site 114, the AOSC 202 is coupled to a line information database (LIDB) site 206 which includes a line information database (LIDB) 208. Both the LSDB and LIDB sites 114, 206 include processors and search engines capable of accessing the databases 116, 208 included therein and returning information in response to look-up requests presented thereto. While the LSDB site includes directory listing information for both published and non-published telephone customers, it lacks the detailed telephone customer records and service subscription information maintained in the LIDB 208. Of interest, in particular exemplary applications, is enhanced service subscription information and enhanced service provider (ESP) information stored in the LIDB.

Figure 2B:
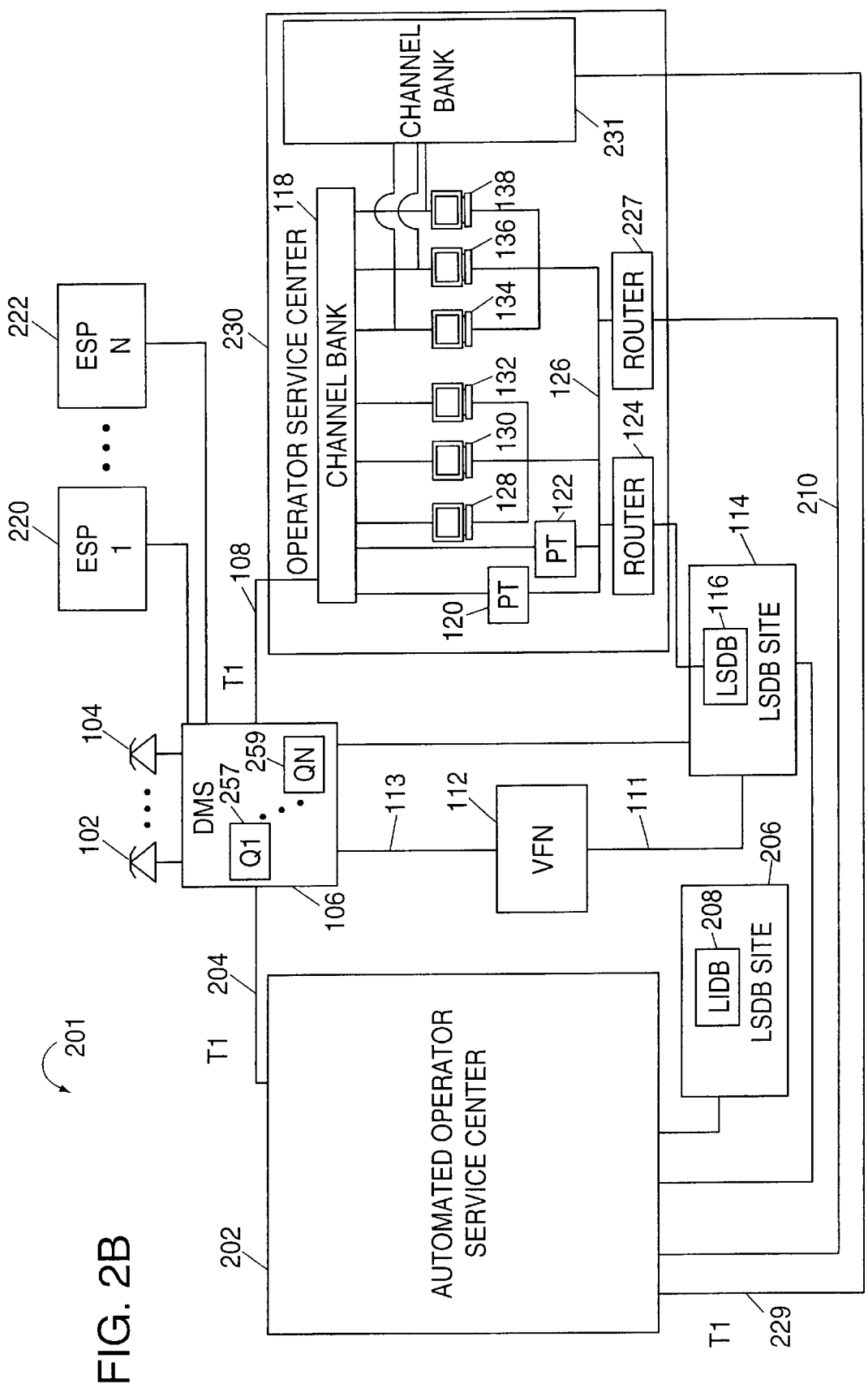

FIG. 2B illustrates another telephone system 201 implemented in accordance with another embodiment of the present invention. The telephone system 201 is similar to the telephone system 200. However, in the telephone system 201 a T1 link 229 is used, in addition to the connection 210, to couple the AOSC 202 to the an operator service center, i.e., the OSC 230. Note that the OSC 230 is similar to the OSC 220 but includes a second channel bank 231 which is coupled to the T1 link 229. The T1 link 229 can be used for providing audio channels between the AOSC 202 and the OSC 230 without the need to go through the DMS 106. The second channel bank 231 divides the 24 channels of the T1 link into individual audio channels. One audio channel from the second channel bank 231 is superimposed on each one of the audio channels from the first channel bank 118 providing an audio path to the individual operator workstations 134, 136, 138 over which audio from the AOSC can be played to a human operator manning the workstation. In this manner audio recorded or generated by the AOSC can be presented to an human operator, e.g., servicing a transferred call which has undergone call pre-processing. When transferring audio to the operator, the audio channel to the customer can be muted. While no connections from the second channel bank 231 to workstations 128, 130, 132 are shown, it is to be understood that connections to these workstations may be made in the same manner as the audio connections to workstations 134, 136, 138.

Note that inside the DMS 106 call queues 257 and 259 are illustrated. These queues are used for holding calls to be processed by different applications. For example, in one embodiment of the present invention one queue 257 is used to hold DA calls while another queue 259 is used to hold calls destined for processing by a DANP application of the present invention. While not shown in some other illustrations of the DMS 106, it is to be understood that the DMS 106 includes queues in the other illustrated embodiments as well.

Figure 3:
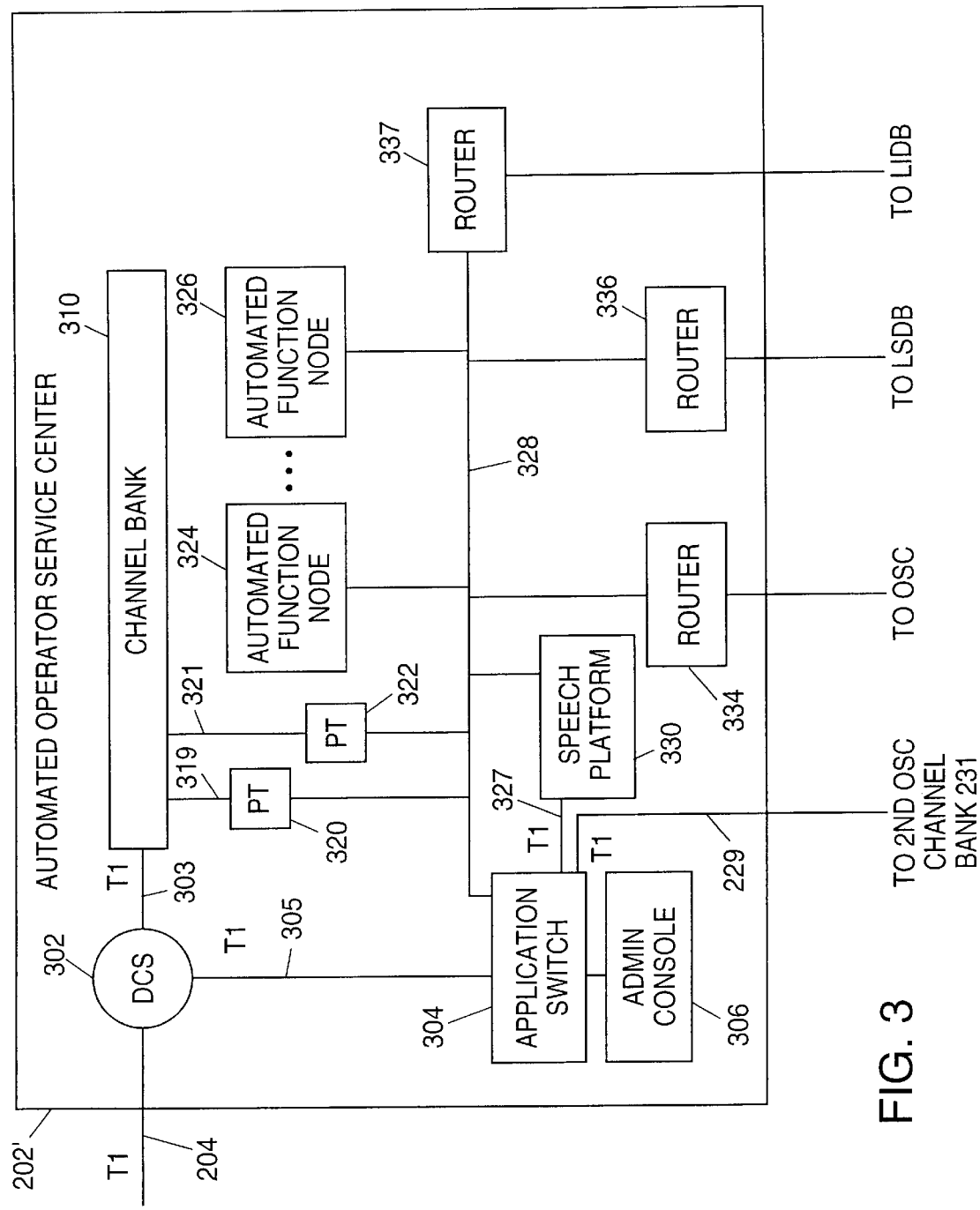
FIG. 3 illustrates an AOSC implemented in accordance with an exemplary embodiment of the present invention.

FIG. 3 illustrates an AOSC 202' implemented in accordance with the present invention. The AOSC 202' comprises a digital cross connection switch (DCS) 302, channel bank 310, first through fourth T1 links 303, 305, 327, 229, first and second protocol translators (PT) 320, 322, a plurality of automated function nodes 324, 326, an application switch 304, an administrator console 306, a speech platform 330, and first, second and third routers 334, 336, 337.

The DCS 302 is coupled to the DMS 106 via the T1 link 204. The DCS serves to split the 24 channels of the incoming T1 link 204 so that channels used for data can be supplied to the channel bank 310 via the first T1 link 303 while audio channels are supplied to application switch 304. Data channels may, if desired, also be supplied to the application switch 304 via the second T1 link 305. In one embodiment, the application switch 304 is a programmable telephone switch of the type commercially available from Summa Four Corporation.

The application switch 304 is used primarily for routing of audio information and for interfacing with the speech platform 327 via the third T1 link 327. The application switch provides audio connectivity between the DMS 106 and speech platform 330 so that prompts and other audio information generated by the speech platform 330 can be relayed to the caller and so that speech input can be received by the speech platform from the caller. The fourth T1 link 229 is provided for coupling the application switch 304 to a manned operator workstation, e.g., via a channel bank. Thus, the fourth T1 link 229 provides a means of sending audio information, e.g., recorded compressed silenced removed speech, to a human operator to which a call is transferred.

In addition to being coupled to the speech platform 330, the application switch is coupled to the administrator console 306 and the LAN 328. The administrator console 306 is used for monitoring the application switch 304 and for configuring the switch. The connection between the switch 304 and LAN 328 allows data and instructions to be exchanged between the switch 304 and devices coupled to the LAN, e.g., the automated function nodes 324, 326.

The speech platform 330 is responsible for performing speech recognition operations, speech generation, e.g., announcement operations, and for recording, processing and outputting received speech. The speech platform can receive instructions, from and exchange data with, the AFNs 324, 326 as well as manned operator workstations via the LAN 328.

Figure 4:
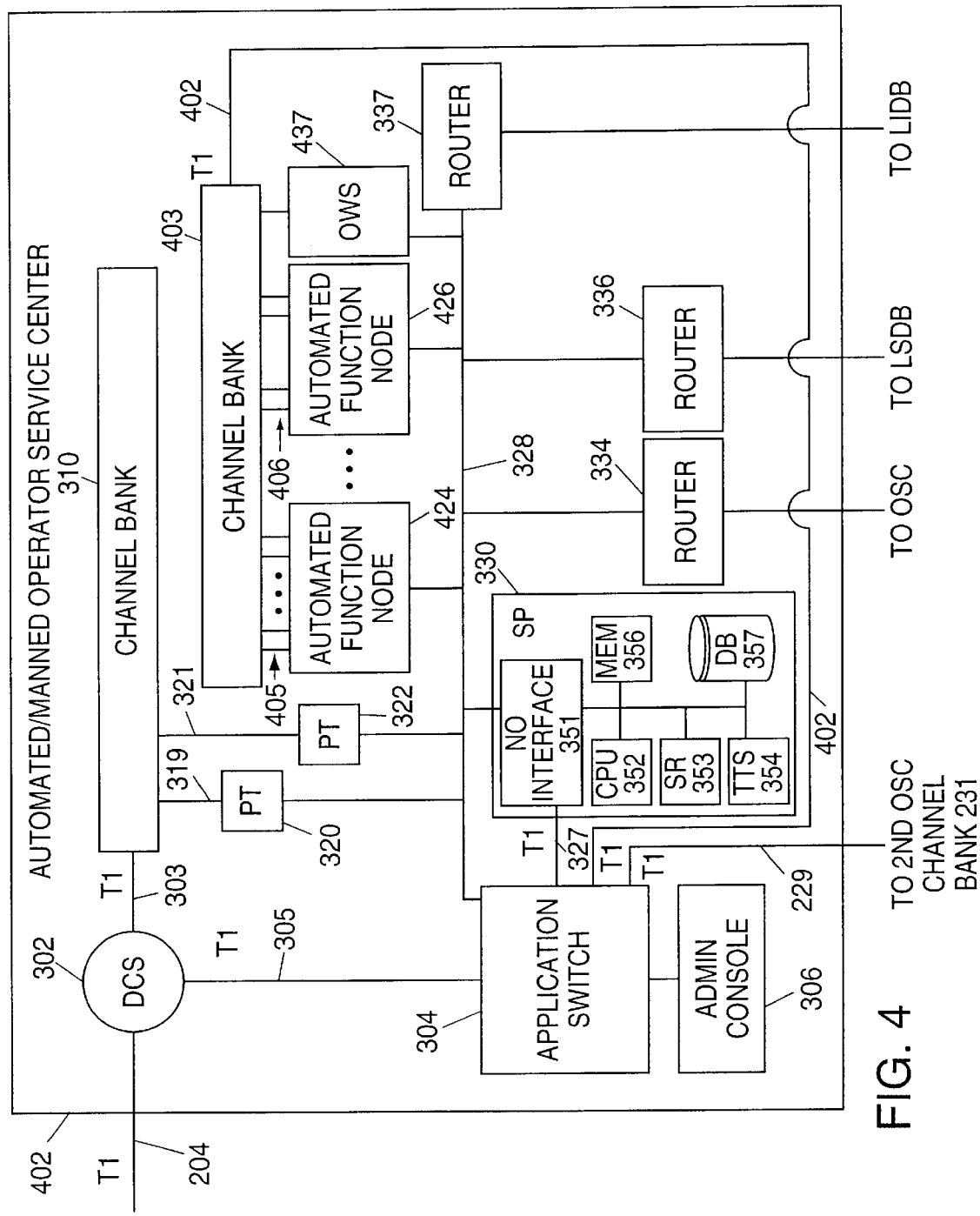
FIG. 4 illustrates an automated/manned operator service center (A/MOSC) which can perform both automated and manned operator service functions.

The speech platform 330 is illustrated in detail in FIG. 4. As illustrated the speech platform 330 includes an I/O interface 351 for interfacing the speech platform with the LAN 328 and application switch 304. In addition, the speech platform 330 includes a CPU 352 for executing instructions and for controlling speech platform operation, a speech recognizer circuit 353, a text to speech device 354 for generating announcements and other speech output, a memory 356 for storing routines and received speech, and a data base 357 including data used for speech recognition operations and for storing recorded speech.

Referring once again to FIG. 3, it can be seen that the LAN 328 serves to couple the main components of the AOSC together. In particular, the LAN 328 serves to connect together the application switch 304, speech platform 330, protocol translators 320, 322, automated function nodes 324, 326 and first through third routers 334, 336, 337.

The first router 334 serves to connect the LAN 328 to the LAN 126 of the manned OSC. The second router 336 serves to connect the LAN 328 to the LSDB 116 while the third router 337 connects the LAN 328 to the LIDB 208. Thus, via the LAN 328 and routers connected thereto, the automated function nodes 324, 326 can communicated with the operator workstations at the manned OSC and obtain information from the LSDB and LIDB.

In the AOSC 202', the channel bank 310 serves to divide the individual data channels of the T1 link 303 and to couple each data channel to a different one of the protocol translators 320, 322. Each protocol translator 320, 322 converts between the X.25 protocol used on the T1 channel and the Ethernet protocol used on the LAN 328. For redundancy at least two protocol converters 320, 322 are used. In the exemplary embodiment, the first protocol translator 320 handles the data traffic associated with even function nodes while the second protocol translator 322 handles the data traffic associated with odd numbered function nodes.

Each of the automated function nodes 324, 326 works in conjunction with the speech platform 330 to perform the functions normally performed by a manned operator position. Accordingly, the AFNs are responsible for generating the control signals normally generated by a manned operator workstation and transmitted to the DMS 106. Each function node 324, 326 may be assigned multiple operator position identifier which are used to login with the switch 106 when performing operator functions. Note that no audio input is provided to the AFNs 324, 326 since, in this unmanned embodiment, the speech processing is performed by the speech platform 330, e.g., under the control of the AFNs 324, 326.

Referring now to FIG. 4, an automated/manned OSC embodiment of the present invention is illustrated. Note that many of the components of the automated/manned OSC 402 are the same as, or similar to, those of the automated OSC 202'. However, in order to allow an AFN 424, 426 to serve as one or more manned operator positions when not being used as a purely automated device, audio channels 405, 406 are supplied to each AFN 424, 426. Each line entering the top of the AFNs 424, 426 represents a separate audio cannel which may be used to service one operator position.

As discussed above, the DCS 302, routes the audio channels which connect the OSC to the DMS 106, to the application switch 304. In the FIG. 4 embodiment, the application switch 304 routes the audio channel associated with each operator position to the speech platform 330 when the position is being used as an automated position, and routes the audio channel via T1 link 402 to the channel bank 403 when the audio channel is being used to support a manned operator position. The switching of audio channels between the AFNs 424, 426 and the SP 330 is performed by the application switch under control of the AFNs 424, 426. Generally, when a human operator logs in or inserts a headset into an AFN operator position, the AFN will instructs the application switch to direct the audio channel to the AFN operator position. When an operator logs out or indicates an absence from an AFN operator position by, e.g., removing his/her headset plug from the AFN operator position, the AFN detects the operator's departure and instructs the application switch to re-direct the audio channel servicing the operator position back to the SP 330.

In cases where an AFN supports multiple operator positions, at any given time, some operator positions may be manned while others are unmanned and operating as automated operator positions.

In addition to the AFNs 424, 426, the automated/manned operator service center may include one or more conventional (manned) operator workstations 437 which each provide a single operator position. In such a case, the audio channel needed to support the OWS 437 is provided via the second channel bank 403 while the data connection is provided via LAN 328.

Figure 5:
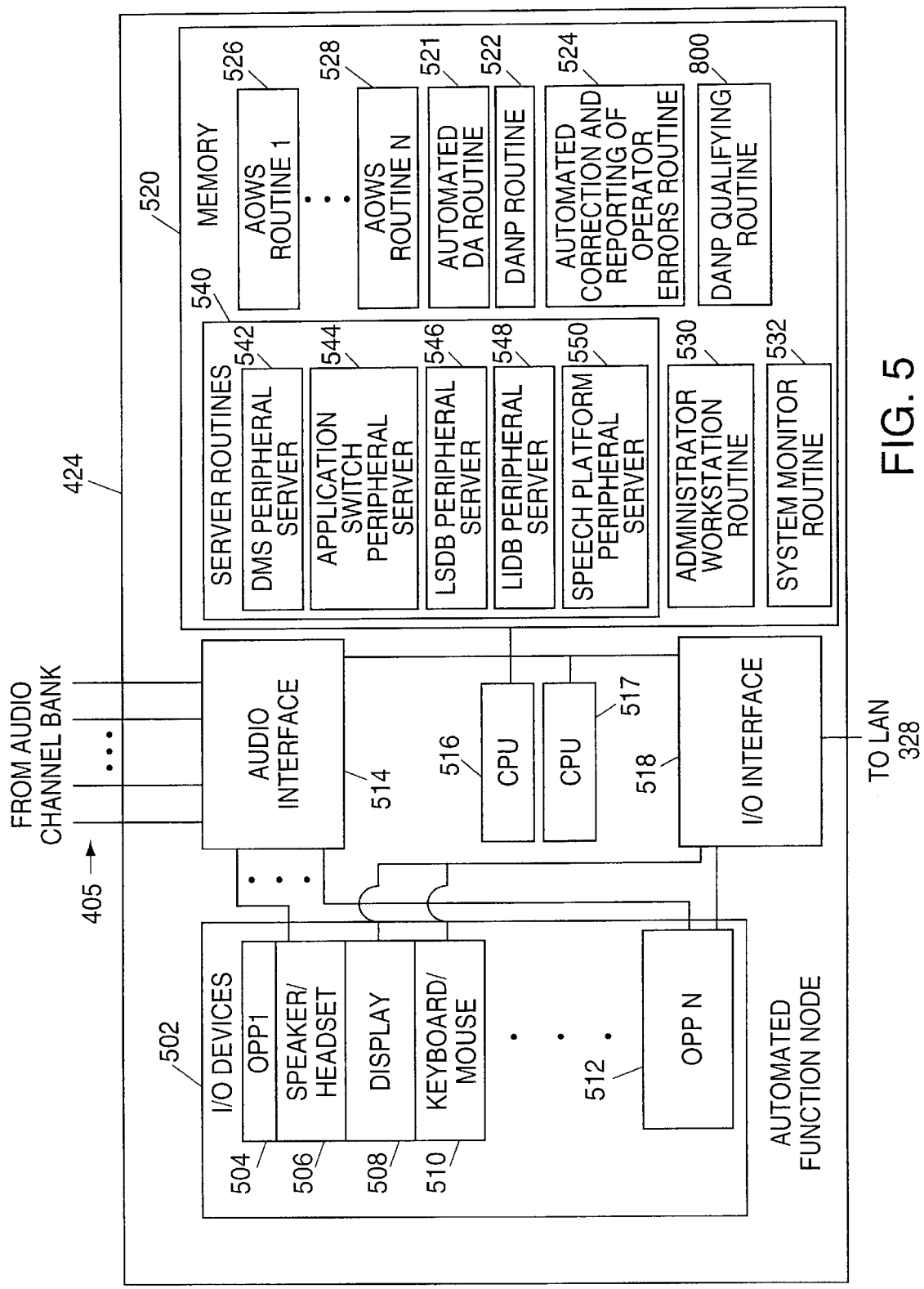
FIG. 5 illustrates an automated function node implemented in accordance with one embodiment of the present invention.

An exemplary AFN 424 will now be described in detail with reference to FIG. 5. As illustrated, the AFN 424 includes a plurality of I/O devices 502, an audio interface 514, CPUs 516, 517, an I/O interface 518, and memory 520.

The I/O devices 502 allow for direct human operator interaction with the AFN 424 when supported operator positions are to be used in a manned capacity. For each operator position 504, 512 a set of input/output devices is provided. The devices include a speaker/headset 506 which will normally include a microphone for receiving operator voice input and a speaker for audio output, a display device 508 for displaying information to the operator and a keyboard/mouse 510 for accepting operator data input. When an operator position is being used as an administrator position from which other operator's actions are being monitored, the same I/O devices used for servicing a call are used by the human system administrator, e.g., to review and make corrections to operator input as well as to perform other operator management functions such as restrict the type of calls a particular operator position is allowed to service.

The audio interface 514 is responsible for coupling the audio channel used to service each operator position to the audio I/O device of the corresponding operator position. In addition, the audio interface is responsible for signaling the CPU 516 when a headset is manually inserted and present in an interface jack associated with a supported operator position. In this manner the CPU 516 is made aware of when an operator position is being used in a manned as opposed to an unmanned capacity.

The I/O interface 518 is used for interfacing between AFN video and data I/O devices 508, 510, the LAN 328 and the various components of the AFN 424 including the CPU 516. Via the I/O interface 518, data may be presented to an operator working at any one of the supported operator positions and exchanged over the LAN 328 with other operator workstations located, e.g., at other OSCs coupled to the LAN 328 via a router.

The CPUs 516 and 517 are responsible for controlling the AFN. By executing the applications and routines stored in the memory 520 they process operator input, input from the speech platform, and generate control signals required to control the DMS 106 in a manner that simulates the processing of a call by a human operator.

While two CPUs are shown, any number of CPUs may be employed. The operating system used by the AFN 424 will normally be responsible for controlling the distribution of processes between CPUs in a multiprocessor environment.

In a multiprocessor embodiment, applications and routines stored in memory 520 may be executed in true parallel. In the case of a single processor embodiment, the applications and routines may be executed in a time shared fashion which will appear as a simultaneous execution of multiple applications and routines to a system user. In such a case, multiple applications and routines may be active at the same time despite the fact that they are executed on a single CPU. Since parallel and time shared use of processors to run multiple applications is well known in the computer art, it will not be described in greater detail herein. In as much as the process and routines of the present invention can be executed on a single CPU 516, for purposes of explanation it will be assumed that the CPU 516 is responsible for executing the routines and applications stored in memory 520.

The memory 520 is used to store the application and routines executed by the CPU 516 as well as to store data used by the AFN 424. As illustrated, the memory includes an automated DA routine 521, a DANP routine 522, an automated correction and reporting of operator errors routine 524, a store and forward routine 525, a plurality of automated operator workstation routines 526, 528, an administrator workstation routine 530, a system monitor routine 532, and a plurality of peripheral server routines 540. The peripheral server routines are used for passing data and instructions between AFN components including applications and routines, and the external devices to which the AFN is coupled. Each peripheral server routine manages a particular device and supports an interface between the device, the system monitoring routine and various application routines that are executed on the AFN 424. Generally a peripheral server is responsible for resource management, e.g., obtaining access to a shared resource, generating alarm messages which are provided to the system monitoring routine in the event of errors, and for interfacing with the application attempting to use the peripheral device with which the peripheral server is associated.

Since the servers are dedicated to obtaining access to a particular resource, converting between instruction and signaling formats used by that resource and an AFN application, server operation is often specific to the particular hardware resource with which the server is associated. Accordingly, there is normally one server routine for each peripheral device with which the AFN interfaces. As illustrated, in the exemplary embodiment the AFN server routines include a DMS peripheral server routine 542, an application switch peripheral server routine 544, an LSDB peripheral server routine 546, an LIDB peripheral server routine 548 and a speech platform peripheral server routine 550. Since many of the peripheral server routines are the same as or similar to those used in conventional operator workstations to interface with such peripheral devices, for purposes of brevity, the peripheral server routines 540 will not be described herein in detail.

Each of the AOWS applications 526, 528 receive the data portion of selected classes of incoming calls from particular queues in the DM5 106 and passes that data to one or more AFN application routines 521, 522, 524, etc. for servicing.

The administrator workstation routine 530 is a centralized point for collection of statistics and alarms generated by applications running on one or more AFNs 424, 425. The administrative workstation routine polls running applications and peripheral serves for statistics, processes the responses and routes the gathered statistical information to a statistics collection machine, e.g., one of the AFNs assigned the task of serving OSC administrative functions, on a periodic basis. On the machine assigned to serve as the statistics collection machine, the administrator workstation routine processes the collected information and organizes it into reports which can be reviewed by a human or automated OSC administrator.

The DMS peripheral server routine (DMSPS) 542 configures the links between the DMS 106 and the AOWs applications 526, 528. Accordingly, the DMSPS 542 is responsible for transmitting login/logout signals to the DMS 106 for each active AOWs at the time each AOWS routine begins operation. Accordingly, when AOWs operation begins, the DMSPS 542 transmits a login request to the DMS 106. In addition to a signal indicating that an operator is requesting to login, the login request includes an operator position identifier and an operator identifier. The operator position identifier uniquely identifies the AOWs operator position to the DMS 106 while the operator identifier is a unique value associated with an individual operator. In the case of the AOWs, the operator is an automated operator. Because the automated system of the present invention logs in and interfaces with the DMS 106 in the same manner as a human operator, the DMS 106 need not know that it is dealing with an automated, as opposed to human, operator. The DMSPs 542 is also responsible for logging out with the DMS 106 when an AOWs routine is terminated, e.g., due to an AFN shutdown for servicing or because an AOWs operator position is being switched to a manned operator position. The DMSPS 542 operates in conjunction with the application switch peripheral server 544 to insure that as a result of the operator login process, the audio channel is directed to the proper location. That is, when a human operator logs in with the DMS 106, the application switch 304 is directed to send the audio associated with the operator position to the manned operator position while in the case of a automated position login, the audio associated with the operator position is directed by the application switch 304 to the speech platform 330.

In addition to being responsible for AOWs logins with the DMS 106, the DMSPS 542 is responsible for responding to DMS 106 queries about operator position status.

The system monitor routine 532 is a background process that monitors components, both hardware and software, of the AFN 424. The system monitor generates alarms which are transmitted to the administrator workstation routine 530 when errors are detected.

Each AOWS routine 526, 528 is responsible for serving as a single automated operator position. Accordingly, a different operator position identifier and operator identifier is associated with each AOWS 526, 528. The AOWS routines 526, 528 interface with the various peripheral devices, e.g., the DMS 106 and SP 330, via the peripheral server routines 540. In addition, the AOWS routines 526, 528 are responsible for calling the particular service application (routine) or applications which are responsible for actually servicing a received call and for generating status signals provided to the system monitor routine 532.

Figure 6:
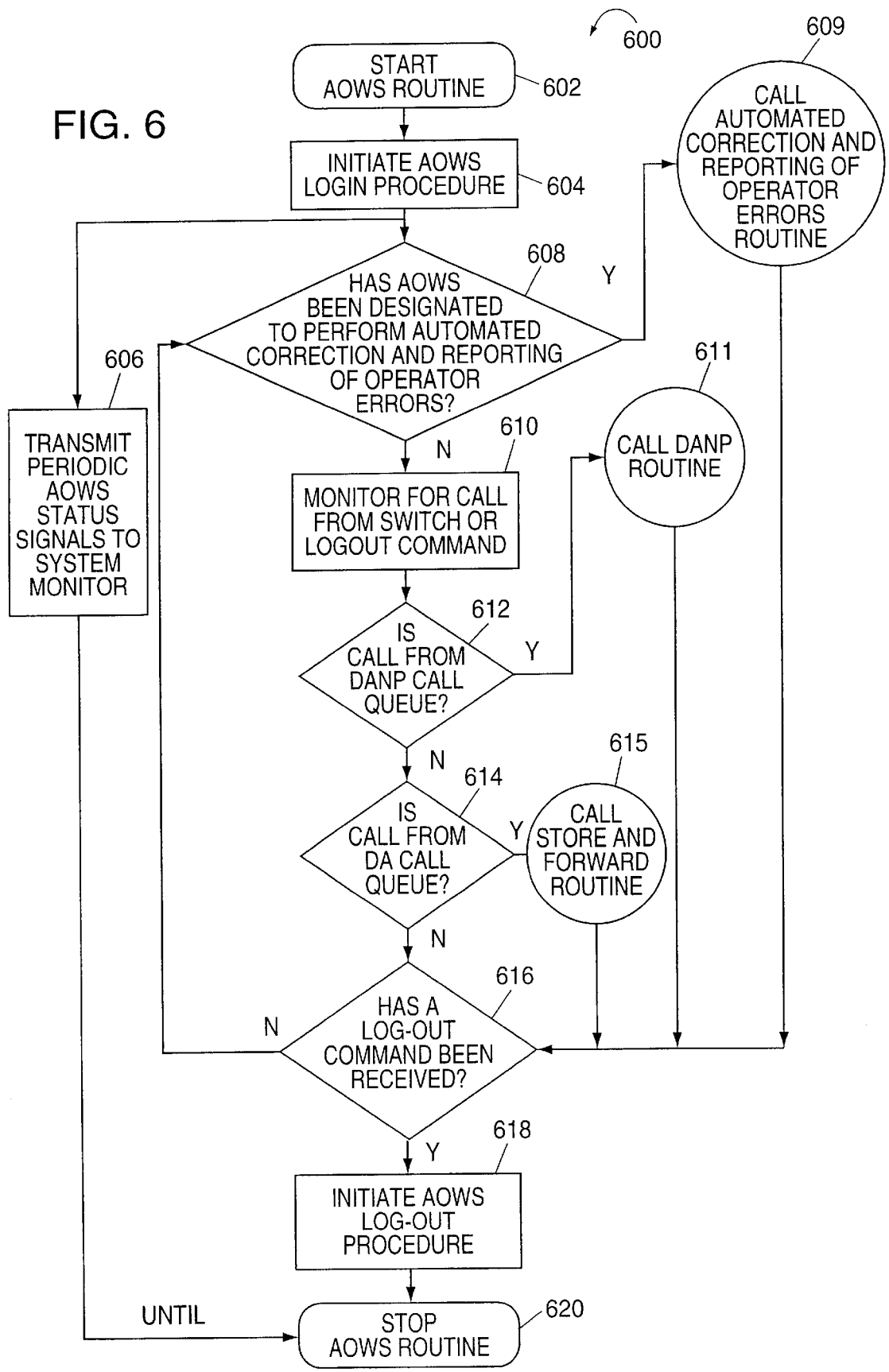
FIG. 6 illustrates an automated operator workstation routine implemented in accordance with the present invention.

FIG. 6 illustrates an AOWS routine 526 implemented in accordance with one exemplary embodiment of the present invention. The routine 600 beings with the start step 602 wherein the routine begins being executed by the CPU 516. In step 604, the AOWS routine initiates a switch login procedure. This involves interfacing with the switch 106 via the DMSPS 542 and providing the DMS 106 a login request, an operator position identifier and an operator identifier associated with the AOWS routine. As discussed above, each AOWS routine 526, 528 is assigned a unique operator position and operator Id. As a result of the login operation the DMS 106 sends an acknowledgement signal to the AOWS 526 and the AOWS is ready to begin servicing calls or performing other automated service functions. From step 604 operation proceeds to steps 606 and step 608.

Step 606 involves the periodic transmission of AOWS status signals to the system monitor, e.g., to indicate that the application is functioning properly. The periodic generation and transmission of AOWS status signals continues until the AOWS routine is terminated in step 620.

In step 608 a determination is made as to whether or not the AOWS has been designated to perform automated correction and reporting of operator errors. Such a designation may be made, e.g., by a human supervisor working at the OSC 220 via LAN 328. In such a case, the human supervisor would normally make a request for AOWS monitoring of one or more human operator positions which the human supervisor identifies via operator position and operator ID information transmitted over the LAN 328. If, in step 608, it is determined that the AOWS routine 526 has designated to perform automated correction and reporting of operator errors, operation proceeds to step 609 wherein the automated correction and reporting of operator errors routine 524 is called and executed. Upon returning from step 609, operation proceeds to step 616.

If in step 608, it is determined that the AOWS routine 526 has not been assigned the task of correcting and reporting operator errors, operation proceeds to step 610. In step 610 the AOWS routine monitors for the receipt of a call from a queue in the DMS 106 or a log-out command. Calls are normally transferred from queues in the DMS 106 to AOWS routines via the DMSPS routine 542. Passed to the AOWS is ANI (Automatic number identification information), a call identifier used to uniquely identify the call to the DMS 106, call type information and information on the application queue in the DMS 106 from which the call was transferred. The call identifier is subsequently supplied by the AOWS or other automated applications to the DMS 106 when the application requests that the call be transferred to another manned or unmanned workstation. It is also associated with and transmitted over the LAN with data collected by servicing the call when the call is transferred to another workstation for additional processing. A log-out command may be received from a human supervisor working at a workstation coupled to the LAN 328, or from the system monitor routine 532 in response to, e.g., the detection or multiple errors or an action by a human operator attempting to login and use the operator position as a manned position.

In step 612 if it is determined that the received call is from the DANP call queue in the DMS 106, operation proceeds to step 611 wherein a call is made to the DANP routine 522 for servicing of the received call. From step 611 operation proceeds to step 616.

If in step 612 it is determined that the call did not come from the DMS DANP call queue, operation proceeds to step 614. In step 614, a determination is made as to whether the call came from the DA call queue. If it did, operation proceeds to step 615 wherein a call is made to the automated DA call processing routine 521.

If in step 614 it is determined that a call was not received from the DMS DA call queue operation proceeds to step 616. In step 616 a determination is made as to whether or not a log-out command was received. If no log-out command was received operation proceeds once again to step 608. However, if a log-out command is detected in step 616 operation proceeds to step 618 wherein the AOWS 600 initiates a log-out procedure. In step 618, via the DMSPS, the AOWS 600 transmits its operator position ID, operator position number and a log-out command to the DMS 106. Upon receiving an acknowledgement of the log-out message from the DMS operation of the AOWS routine 526 ceases until it is restarted.

Figure 7B:
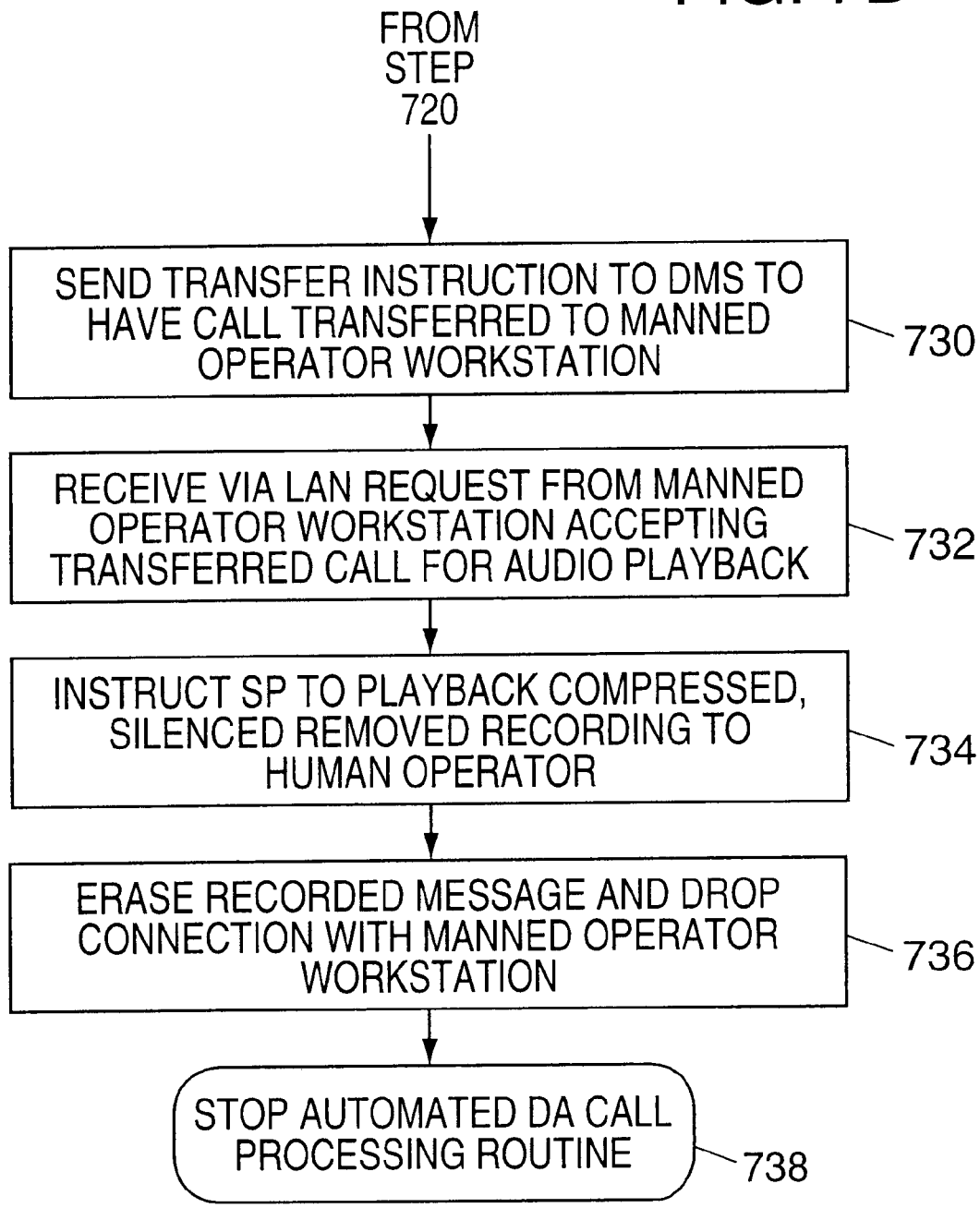
FIG. 7, which comprises the combination of FIGS. 7A–7B, illustrates a directory assisted non-pub number (DANP) application qualifying routine.

An exemplary automated DA service routine 521 will now be described with reference to FIG. 7 which comprises the combination of FIGS. 7A and 7B.

As illustrated in FIG. 7 the automated DA service (ADAS) routine 521 begins in step 702 wherein the routine begins being executed by the CPU 516. Operation proceeds to step 704 wherein an instruction is transmitted form the AFN 424 to the SP 330 to play a prompt requesting desired city and listing (name) information. In step 706, the ADAS routine 521, running on the AFN, instructs the speech platform 330 to perform compression and silence removal on any speech obtained in response to the prompt and to perform speech recognition on the response. Speech compression involves the removal of portions of words or letters while silence removal involves the removal of silence from received speech thereby reducing the duration of the speech.

In step 708, the speech recognizer of the SP 330 is used to detect a response from the caller. Once detected the response is processed according to the received instructions.

In step 710 the compressed silence removed speech generated by processing the caller's response is recorded along with the call ID used to uniquely identify the call. Thus, the call ID can be used to subsequently identify the recording for retrieval or deletion purposes.

In step 714, the results of the speech recognition operation performed on the received response is used to perform an LSD look-up operation. In particular, the ADAS routine 521 initiates an LSDB look-up operation to determine the requested listing information by transmitting a listing information request to the LSDB. The request includes, e.g., the city and name information, the operator position ID and operator ID to be used in returning the requested information to the appropriate operator position.

Upon receiving the results of the LSDB look-up operation, the ADAS routine, in step 716, instructions the text to speech device in the SP 330 to announce to the caller the returned listing information, e.g., name and address information, without providing the associated telephone numbers. Then, in step 718, the user is requested to select one of the returned listings or hold for operator assistance. Selection of a listing may be made by pressing a DTMF key or by speech input, e.g., saying "listing one please". In step 720, the speech platform 330 which may include a DTMF detector in addition to a speech recognizer 353, determines whether a DTMF or verbal response has been received and provides the response information to the ADAS routine 702.

If in step 720, a response is detected, operation proceeds to step 722. In step 722 a determination is made as to whether or not the selected listing corresponds to a non-pub number. If the selected listing corresponds to a non-pub number, operation proceeds via step 724 to the DANP qualifying routine 800.

However, if the selected listing corresponds to a published number operation proceeds from step 722 to step 726. In step 726, the caller is provided the telephone number for the selected listing via the TTS device included in the speech platform 330. With the caller having been provided the desired telephone number information, in step 728 the AFN sends a signal to the DMS 106 to bill the DA call and to terminate the call connection if it has not yet been terminated due to the caller disconnecting. Operation then proceeds from step 728 to step 738.

In step 720 if a DTMF or verbal response selecting one of the listings was not received, operation proceeds to step 730 wherein an instruction is sent to the DMS 106 to transfer the call to a manned operator workstation for human DA operator assistance. A separate pre-operator processed call queue may be maintained in the DMS 106 for DA calls intended for a manned OWS which have already been processed by the AOSC. The transfer instruction to the DMS includes the call identifier, the operator position identifier and the operator identifier of the operator position transferring the call.

Once the call is transferred and accepted by a manned OWS, the manned operator workstation recognizes from the fact that the call is received from a pre-operator processed call queue that data and/or audio associate with the call can be obtained from the AOSC 202 or 202'. Via line 210, the manned operator workstation receiving the call transmits a request for audio and data, from the AOSC, associated with the transferred call. The request includes the unique call identifier assigned to the call and the operator position and operator ID associated with the OWS which received the transferred call. Step 732 represents the receipt by the AOWS of the request for audio and data associated with the transferred call. In step 734, the SP 330 is instructed by the ADAS routine to playback the compressed silence removed recording to the human operator to which the call was transferred. This is done by outputting the recorded audio via the channel of the T1 link 229 corresponding to the OWS to which the call was transferred. In addition to receiving the recorded audio information, the manned OWS also receives the listing information, i.e., data, which was automatically retrieved by the AOSC 424 from the LSDB. Providing this data may eliminate the need for the operator to do a LSDB look-up operation.

Once the recorded audio is output, the recorded message is erased and the connection with the manned operator workstation is dropped in step 736. The automated DA call processing routine 521 is then stopped in step 738 until being called again by an AOWS routine 526, 528.

In the above described manner, the AOSC of the present invention can handle many DA calls in a fully automated manner without the need for a human operator's involvement and can reduce the amount of time required for a human operator to service a DA call even when a human operator's involvement is not totally avoided.

Figure 8:
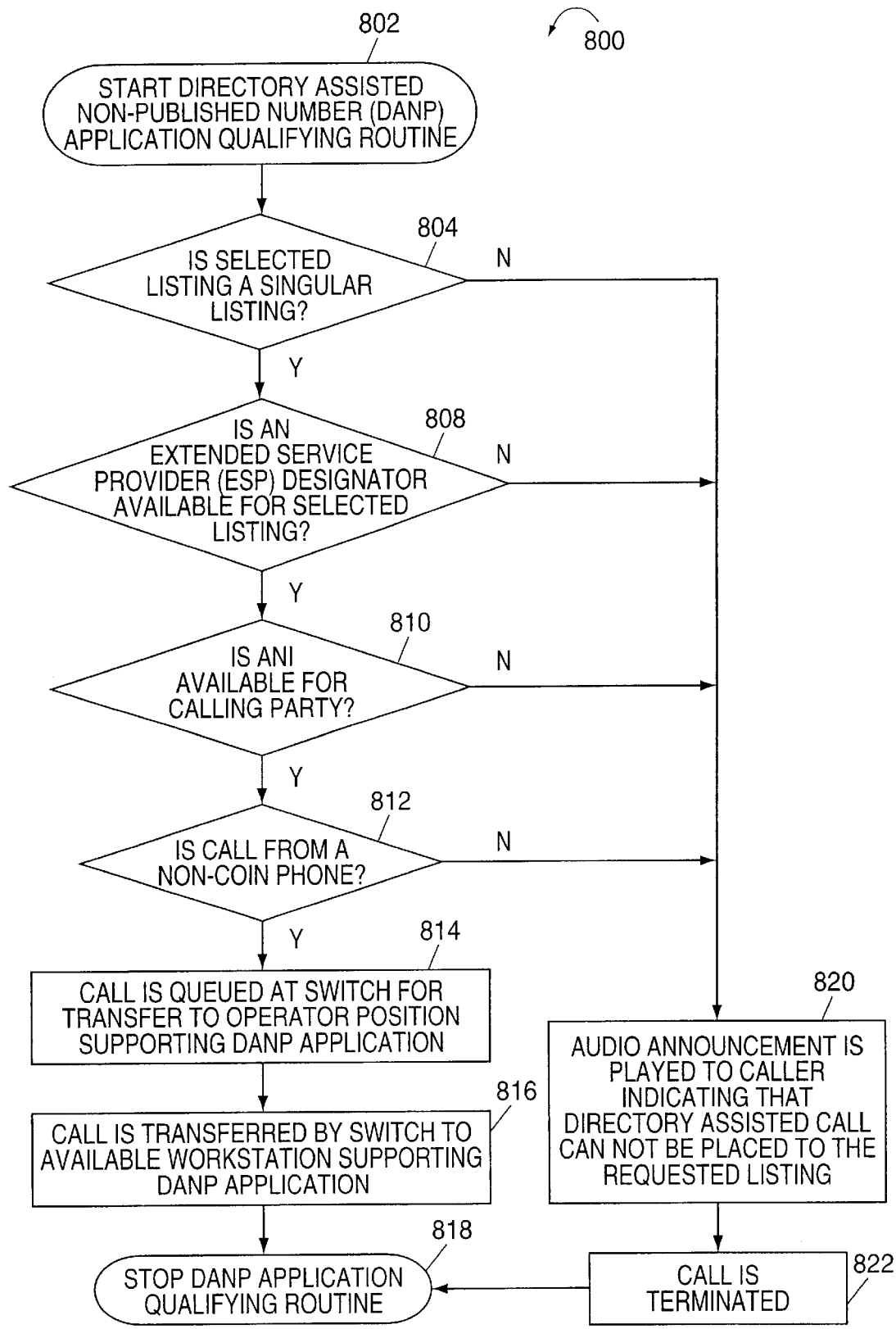
FIG. 8, which comprises the combination of FIGS. 8A–8B, illustrates a DANP application implemented in accordance with one embodiment of the present invention.

An exemplary DANP application qualifying routine 800 will now be discussed with reference to FIG. 8. It is the responsibility of the DANP application qualifying routine 800 to determine if a DA call requesting non-pub number information is suitable for servicing by the automated DANP application. The DANP application provides a caller the opportunity to leave a message to be forwarded to the non-pub subscriber assuming the non-pub customer subscribes to a message forwarding service offered by one or more extended service providers. A call is considered serviceable by the DANP application if an extended service provider is available for forwarding the message, ANI information is available for the calling party so the caller can be independently identified, and the caller is not making the call from a coin operated phone making it difficult or impossible to identify the caller.

As illustrated, the DANP application qualifying routine begins in step 802 and proceeds from there to step 804. In step 804, a determination is made as to whether or not the selected listing is a singular listing. If it is, operation proceeds to step 808 wherein a determination is made, e.g., by performing a LIDB look-up operation, as to whether an extended service provider (ESP) designator is available for the selected listing. In the LIDB, a ESP identifier is provided for each non-pub number subscriber who subscribers to a message forwarding service. It indicates which one of a plurality of possible ESPs, if any, should be used for forwarding messages to the non-pub number subscriber.

If an ESP designator is obtained from the LIDB in response to a LIDB look-up operation, operation proceeds to step 810 wherein a check is made to determine if ANI information is available for the calling party. If ANI information is available, operation proceeds to step 812 where a determination is made as to whether or not the DA call is being made from a non-coin phone. If the call is from a non-coin phone, it is determined that the call qualifies for DANP service a signal is sent to the DMS 106 to transfer the call to an operator position which supports the DANP application. As a result of the transfer request, in step 814, the call is queued at the DMS 106 pending its transfer. In step 816, the call is transferred to an available workstation supporting the DANP application and then in step 818 the DANP application qualifying routine is stopped pending its re-execution.

If the answers to any of the checks made in steps 804, 808, 810, 812 is NO, operation proceeds from these steps to step 820, wherein the speech platform is instructed to play an audio announcement to the caller indicating that the directory assisted call can not be placed to the requested listing because the listing is a non-published listing. Operation proceeds from step 820 to step 822 wherein the DMS 106 is instructed to terminate the call. From step 822 operation proceeds to step 818 where, as discussed above, the DANP application qualifying routine is stopped.

Figure 9A:
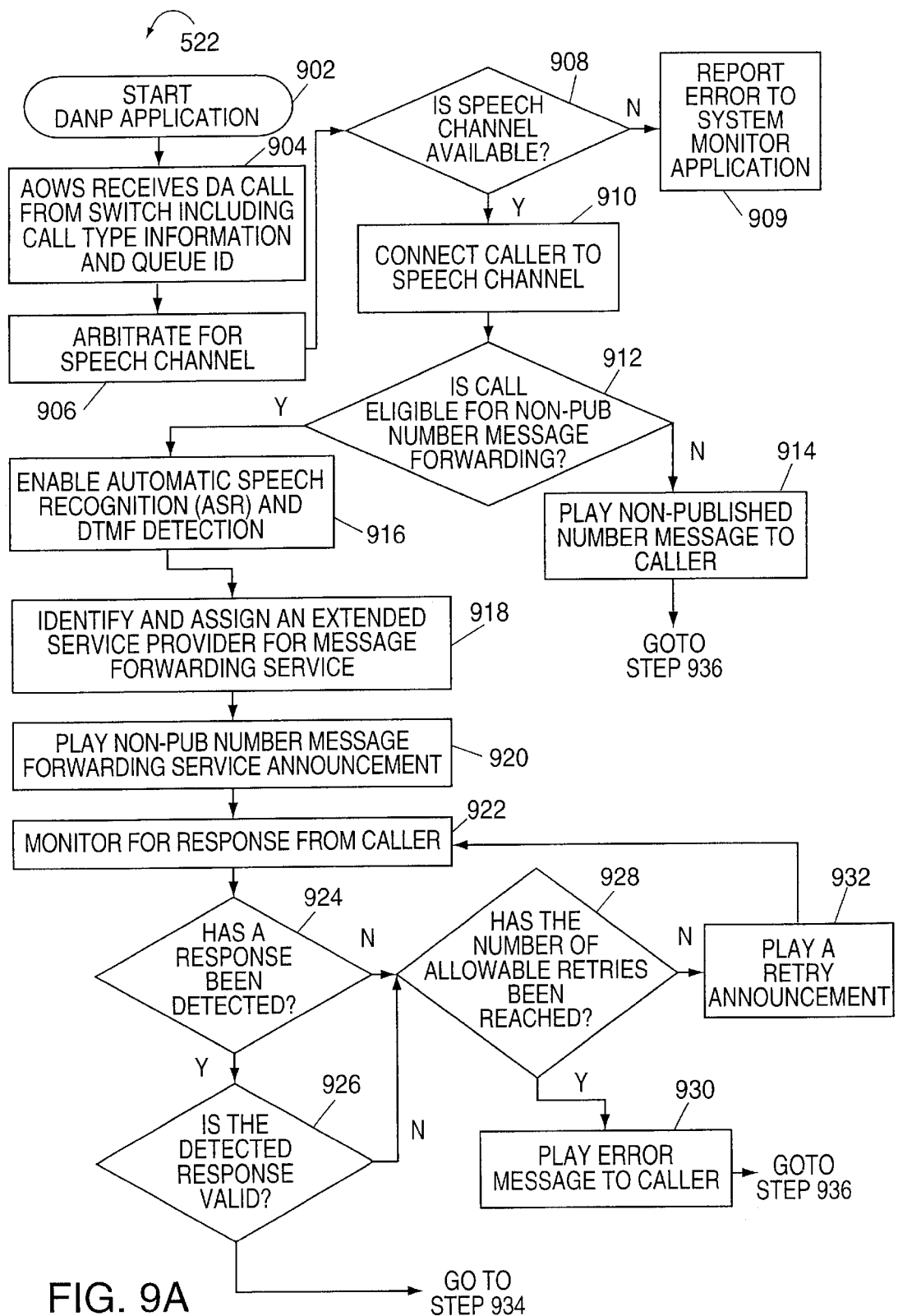
FIG. 9 illustrates a DA call pre-processing routine used to process calls prior to servicing by a human operator.
Figure 9B:
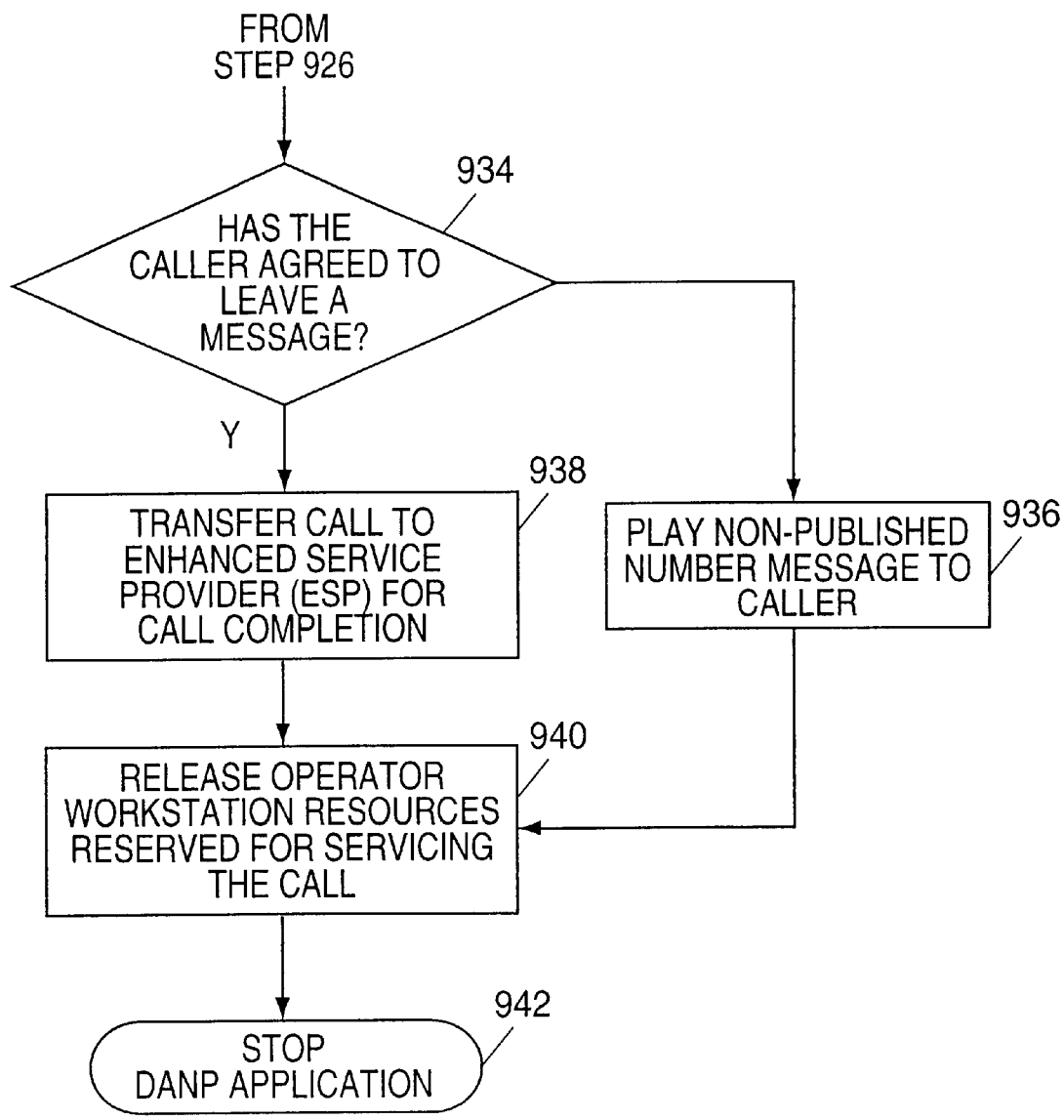

FIG. 9, which comprises the combination of FIGS. 9A and 9B illustrates an exemplary DANP application 522. The DANP application begins in step 902, e.g., when called by an AOWS routine 526, 528. In step 904, the DANP application receives a DA call to be processed from the DMS 106. The received call includes such information as the call type, a call identifier, and a queue Id indicating which DMS queue it was received from. Operation proceeds from step 904 to step 906 wherein the DANP application arbitrates, e.g., via peripheral server, for one of the speech platforms speech channels. In step 908 a determination is made as to whether or not a speech channel is available for use by the DANAP application. If no speech channel is available operation proceeds to step 909 wherein an error is reported to the system monitor application and error recovery is performed.

If in step 908, it is determined that a speech channel is available, the caller is connected to the speech channel (recognizer and TTS) of the SP 330 in response to an instruction from the AFN. Next, in step 912, a determination is made as to whether or not the call is eligible for non-pub number message forwarding. This involves performing a LIDB look-up operation to accesses the message forwarding and ESP information associated with the selected listing entry or obtaining this information from data that was transmitted to the DANP application 522 when the call was transferred. If the required message forwarding, e.g., ESP provider information, can be accessed and the ESP provider can be contacted, operation proceeds to step 916. However, if in step 912 it is determined that the call is not eligible for non-pub message forwarding, operation proceeds from step 912 to step 914 wherein a message is played by the SP to the caller indicating that the selected listing is a non-pub number which can not be provided to the caller. Operation then proceeds from step 914 to step 936.

The path which begins with step 916 is responsible for offering the caller the opportunity to leave a message for the non-pub number subscriber who's listing was selected.

In step 916 automatic speech recognition and DTMF detection by the SP 330 is enable by the DANP application 522. Then, in step 918, the ESP 220 or 222 identified from the LIDB look-up operation, is assigned to service the call. Next, in step 920, a non-pub number message forwarding announcement, e.g., the message: "The listing you requested is a non-published message. If you would like to leave a message for the party you are trying to reach say YES or press one now." is played.

Once the message is played to the calling party, the system, and the SP 330 in particular, monitors for a response from the caller. In step 924 a determination is made as to whether, in a preselected time period, e.g., 20 seconds, a response was detected. If in step 924 no response is detected, operation proceeds to step 928.

If in step 924 a response is detected, operation proceeds to step 926. In step 926 a determination is made as to whether or not the detected response was valid. If the detected response was not a valid response operation proceeds to step 928.

In step 928 a determination is made as to whether a preselected maximum number, e.g., 2, of retries has been reached. If the number of allowable response retries has not been reached, operation proceeds to step 932 wherein an announcement requesting re-entry of the response is played to the caller. From step 932 operation proceeds once again to step 922.

However, if in step 928 it is determined that the maximum number of allowable number of retries has been reached, operation proceeds to step 930. In step 930 and error message is played to the caller and then operation proceeds to step 936.

If a valid response is detected in step 926 operation proceeds to step 934 wherein a determination is made as to whether the caller has agreed to leave a message. If in step 934 it is determined that the caller has indicated that he/she does not intend to leave a message operation proceeds to step 936 wherein the DMS 106 is instructed to terminate the call connection. Operation proceeds from step 936 to step 940.

If however, in step 934 it is determined that the caller has agreed to leave a message operation proceeds from step 934 to step 938. In step 938 the DANP application running on the AFN instructs the DMS 106 to transfer the call to the ESP provider identified from the LIDB lookup operation for call completion. As part of the call transfer, the ESP provider is sent the unpublished telephone number corresponding to the listing selected by the caller. The ESP provider, with whom the non-pub subscriber has contracted for message forwarding service, uses this number to identify the non-pub customer to whom the message being left by the transferred DA caller is to be sent. While the operation in step 938 is described as a call transfer, in one embodiment it is actually implemented using a call completion instruction where the DMS is instructed to call the ESP and complete the DA call to the ESP.

With the call transferred, operation proceeds from step 938 to step 940 wherein the resources reserved by the DANP application, e.g., the SP 330 resources, are released. From step 940 operation proceeds to step 942 wherein the DANP application is stopped pending its being called once again.

Once the call is transferred to the ESP 220 or 222, the ESP will normally record a message from the caller. The ESP may then call the non-pub subscriber and forward the message, or simply store the message until the non-pub subscriber calls in to check for messages. Alternatively, the subscriber can instruct the ESP to actively forward calls during a portion of the day but merely to store messages during other portions of the day. Because the non-pub subscriber can select one of a plurality of message forwarding services to be used, competition can exist between ESPs 220, 222 on both the service features offered and on price.

While the transfer of a call to the DANP application was described in the context of a transfer from an automated operator position, it is to be understood that it is contemplated that manned operator positions, e.g., OSW 128, 130, 132, will also transfer non-pub number calls to automated operator positions for servicing by the automated DANP application. In such a case, call processing by the DANP application represents a post-operator call processing operation.

Referring now to FIG. 10, an exemplary automated reporting and correction of operator errors routine 524 is illustrated. The routine 524 begins in step 1002 with the routine being executed by the CPU 516 in response to a call, e.g., from an AOWS routine.

From step 1002 operation proceeds to step 1004 wherein operator position information, identifying the position to be monitored, is obtained from information provided to the AOWS which called routine 524 or from a set of stored operation position information maintained in the memory 520. The obtained operator position information includes the ID of the operator position to be monitored. It may also include an operator ID and information on which A/MOSC 202' or OSC 220 the position is located at.

Once the information identifying the operator position to be monitored is obtained, operation proceeds to step 1006, wherein the DMS 106 is sent a message indicating that the identified operator position is to be monitored. The message to the DMS 106 includes the operator position ID of the position to be monitored and the operation position ID of the AOWS 526, 528 which is to perform the monitoring via execution of the routine 524.

In step 1008, operator position status information is received from the DMS 106 in response to the monitoring instruction. The status information indicates, e.g., whether the operator position is currently being manned. If manned, the status information also provides the operator ID associated with the human operator manning the operator position at the time the monitoring is to be performed.

Based on the operator position status information obtained from the DMS 106, a determination is made in step 1010 as to whether or not the position to be monitored is in use, e.g., manned. If the operator position is not in use, operation proceeds to step 1004 and another operator position is selected for monitoring. However, if in step 1010 it is determined that the operator position to be monitored is manned, operation proceeds to step 1012.

In step 1012, the DMS is instructed by the routine 524 to conference in the AOWS on calls to the monitored operator position. In this manner, the SP 330 can be used to monitor the audio portion of operator assisted calls serviced by the monitored operator position and the AFN can receive data and instructions transmitted form the DMS 106 to the monitored operator position. Next, in step 1014, a LAN connection is established, e.g., using a router, between the monitored operator workstation, identified by the ID of the operator position to be monitored, and the AOWS performing the monitoring. In addition, the monitored operator workstation is instructed in step 1014 to communicate (mirror) data input by the human operator, e.g., keystrokes and mouse input, to the AOWS performing the monitoring.

With data and audio connections established to the workstation (operator position) to be monitored, in step 1016, the supervisor workstation doing the monitoring checks for operator input errors and opportunities to make data input suggestions to the human operator being monitored. For example, the supervisor AOWS may check for spelling errors or a series of keystrokes which are likely to be the partial input of a common name or frequently input phrase.

In step 1018, the workstation performing the monitoring makes, over the data connection established with the monitored workstation, input corrections, e.g., of spelling errors, and provides input suggestions, e.g., the complete entry of a name or word which the operator can accept or overtype on the display screen.

In addition to making operator input corrections and suggestions, in step 1018, the routine 524 creates real time error reports which are transmitted, e.g., via LAN 328 and the routers connected thereto to a human supervisor via a supervisor workstation located at the same OSC as the operator position being monitored. Such real time error reporting allows a human supervisor to investigate the source of repeated errors within minutes of the detection of such errors. This facilitates the rapid detection of human operators whose work is suffering due to substance abuse problems or emotional disorders. It also allows for the rapid detection of mechanical problems such as faulty keyboards which may result in repeated input errors.

From step 1020 operation proceeds to step 1022 wherein a determination is made as to whether or not the DMS has indicated that the supervised workstation is no longer in use or a command to stop monitoring the monitored operator position has been received. If no command to stop monitoring has been received and the operator workstation remains manned, operation proceeds once again to step 1016 where and the monitoring operation is continued.

However, if in step 1022 a command to stop monitoring is detected or the operator position ceases being manned, operation will proceed to step 1023 wherein the routine 524 is stopped.

While the monitoring and correcting of operator errors has been described in the context of an AOWS monitoring a single manned operator workstation, multiple operator positions at different operator workstations may be monitored at the same time by a single AOWS.

Numerous features and applications which can be implemented by the AOWC of the present invention have been described. Numerous additional applications are also possible. For example, AOWS routines can be used to provide callers restaurant information or directional information obtained from a database or other information provider coupled to the LAN 328.

In one embodiment, a caller's location is determined using ANI call information provided by the DMS 106 to the AOWS via a LIDB look-up operation. Once the caller's location is determined, a restaurant database look-up operation is performed. Restaurants near the caller's location are then suggested via the text to speech device included in the SP 330. Thus, restaurant information can be provided in an automated manner without the need for human operator involvement.

In another embodiment, directional information is provided to a caller. Once again the AOWS determines the caller's location using ANI information provided by the DMS 106. The caller is requested to enter a telephone number corresponding to the destination the caller is trying to reach. A first database look-up operation is performed to identify the address corresponding to the provided telephone number. A second database look-up operation of directional information, e.g., maps, is then performed to determine a route from the caller's location to the destination. The directions are then provided to the caller via the text to speech system of the SP 330 and/or are faxed to a fax number input by the caller.

Numerous other automated information provision services are also possible using the methods and apparatus of the present invention.

What is claimed is:

1. A method of servicing telephone calls, comprising the steps of:
    providing each of a plurality of operator positions with an audio channel for receiving speech from a caller and a data channel connected to a local area network for receiving data from the local area network, the audio channel and data channel provided to each operator position forming an audio/data channel set, each of the plurality of operator positions being provided with a different audio/data channel set;
    using at least one of the audio/data channel sets used to provide audio and data to an unmanned automated operator position during a first part of a day; and
    reusing said at least one of the audio/data channel sets used to provide audio and data to the unmanned automated operator position to provide audio and data to a manned operator position during a second portion of the day.

2. The method of claim 1, further comprising the step of:
    operating at least one unmanned automated operator position to service a directory assistance call without human involvement by using a speech recognizer circuit.

3. The method of claim 2,
    wherein each of said data channels of a data channel pair is implemented using an Ethernet connection,
    the method further comprising the step of:
        locating the manned and unmanned automated operator positions in the same room.

4. A method of servicing telephone calls, the method comprising the steps of:
    providing a plurality of operator workstations, each workstation capable of operating both as an unmanned automated operator position and as a manned operator position;
    coupling each of said operator workstations to a telephone switch using a channel bank, thereby enabling each of said operator workstations to receive, via said channel bank, audio signals from calls routed through said telephone switch;
    operating at least one of the operator workstations to service calls as a manned operator position during a first portion of a day and operating the at least one operator workstation to service calls as an automated unmanned operator position during a second portion of the day.

5. The method of claim 4, wherein each of the operator workstations including a speech recognizer, the step of operating at least one of the operator workstations to service calls as an automated unmanned operator position during a second portion of the day including the step of supplying audio received by the operator workstation from the telephone switch to the speech recognizer.

6. The method of claim 4, further comprising the step of:
    operating said at least one of the operator workstations to detect when the workstation is manned by a human operator; and
    switching from servicing calls as an automated unmanned operator position to servicing calls as a manned operator position when it is detected that a human operator initiates the manning of the operator workstation.

7. The method of claim 6, wherein the step of switching from servicing calls as an automated unmanned operator position to servicing calls as a manned operator position includes:
    monitoring to detect when an operator connects a headset to said at least one of the operator workstations; and
    in response to detecting the connection of a headset, directing the audio received from the switch to the operator headset.

8. A system for processing telephone calls received by a telephone switch, comprising;
    a function node coupled to the telephone switch for receiving data associated with a telephone call from the switch, the function node including a human operator I/O device and means for detecting the presence of a human operator;
    a speech processing device, separate from the function node, for processing received speech; and
    a switching device coupled to the telephone switch, the function node and the speech processing device for receiving the audio portion of the telephone call from the telephone switch and for routing the audio portion of the call to the function node when the presence of a human operator is detected and for routing the audio portion of the call to the speech processing device when the presence of a human operator is not detected.

9. The system of claim 8, wherein the speech processing device includes a speech recognizer.

10. The system of claim 9, wherein the speech processing device includes a speech generator.

11. The system of claim 8, further comprising:

a data connection between the function node and the speech processing device.

12. The system of claim 8, further comprising:
a data link coupling the function node to a manned operator workstation located in a different room than the function node.

13. The system of claim 12, wherein the function node includes a plurality of processors for implementing call servicing applications.

14. A method of servicing telephone calls, comprising the steps of:
using an unmanned automated apparatus to automatically login to a telephone switch using a first operator position identifier that identifies an operator position provided by the automated apparatus;
operating the automated apparatus to receive a call from the telephone switch;
operating the automated apparatus service the call by performing a call processing operation; and
operating the automated apparatus to transmit a call processing command to the telephone switch.

15. The method of claim 14, wherein the call processing command is a call transfer command.

16. The method of claim 14 wherein the call processing command is a call transfer command instructing the telephone switch to transfer the call to a manned operator position for additional servicing.

17. The method of claim 14 wherein the call processing command is a billing instruction.

18. The method of claim 1, wherein the step of using the unmanned automated apparatus to login to the telephone switch includes the step of transmitting an operator identifier associated with the unmanned automated apparatus to the telephone switch.

19. The method of claim 1, wherein the step of operating the automated apparatus to perform a call processing operation includes the step of:
performing a speech recognition operation on an audio signal obtained from the switch.

20. The method of claim 19, wherein the step of operating the automated apparatus to perform a call processing operation includes the step of:
performing a database look-up operation using the results of the speech recognition operation.

21. The method of claim 20, wherein the step of operating the automated apparatus to perform a call processing operation includes the step of:
using a text to speech system to provide listing information returned from a look-up operation to a caller.

22. The method of claim 14, further comprising the steps of:
using the unmanned automated apparatus to login to the telephone switch using a second operator position identifier associated with the automated apparatus such that the automated apparatus is logged into the switch using multiple operator position identifiers at the same time; and
operating the automated apparatus to service at least two telephone calls at the same time, each call being directed to a different operator position associated with the automated apparatus.

23. A method of servicing telephone calls, comprising the steps of:
using an unmanned automated apparatus to login to a telephone switch using a plurality of operator position identifiers, each operator position identifier identifying one of a plurality of operator positions provided by the automated apparatus;
operating the automated apparatus to receive a call from the telephone switch;
operating the automated apparatus to perform a call processing operation; and
operating the automated apparatus to transmit a call processing command to the telephone switch.

24. A device for automating the servicing of a call from a caller received by a switch, the device comprising:
a speech processor coupled to the switch for receiving audio input from the switch; and
an automated function node providing at least one automated operated position which is identified to the switch by at least one operator position identifier, the automated function node being coupled to the speech processor and the switch, the function node including means for performing automated call servicing operations without humanh operator input, at least one of said servicing operations including instructing the switch to perform a billing operation without human operator input.

25. The device of claim 24, further comprising:
a router coupled to the function node and to a manned telephone operator workstation for exchanging information between the automated function node and the manned telephone operator workstation center.

* * * * *